US012065560B2

(12) United States Patent
Kim et al.

(10) Patent No.: US 12,065,560 B2
(45) Date of Patent: Aug. 20, 2024

(54) PROPYLENE-ETHYLENE RANDOM COPOLYMER

(71) Applicant: LG Chem, Ltd., Seoul (KR)

(72) Inventors: Byung Seok Kim, Daejeon (KR); Insun Lee, Daejeon (KR); Seok Hwan Kim, Daejeon (KR); Jung Won Lee, Daejeon (KR); Donghyeon Gwon, Daejeon (KR); Seyoung Kim, Daejeon (KR); Heekwang Park, Daejeon (KR); Jihwa Ye, Daejeon (KR)

(73) Assignee: LG Chem, Ltd., Seoul (KR)

( * ) Notice: Subject to any disclaimer, the term of this patent is extended or adjusted under 35 U.S.C. 154(b) by 538 days.

(21) Appl. No.: 17/602,495

(22) PCT Filed: Jun. 11, 2020

(86) PCT No.: PCT/KR2020/007547
§ 371 (c)(1),
(2) Date: Oct. 8, 2021

(87) PCT Pub. No.: WO2020/251264
PCT Pub. Date: Dec. 17, 2020

(65) Prior Publication Data
US 2022/0213303 A1     Jul. 7, 2022

(30) Foreign Application Priority Data

Jun. 11, 2019 (KR) .................. 10-2019-0068772
Jun. 10, 2020 (KR) .................. 10-2020-0070124

(51) Int. Cl.
| | | |
|---|---|---|
| C08F 210/16 | (2006.01) | |
| C08F 4/6592 | (2006.01) | |
| C08F 210/06 | (2006.01) | |
| C08L 23/16 | (2006.01) | |
| C08F 210/02 | (2006.01) | |

(52) U.S. Cl.
CPC .......... *C08L 23/16* (2013.01); *C08F 4/65927* (2013.01); *C08F 210/06* (2013.01); *C08F 210/16* (2013.01); *C08F 210/02* (2013.01); *C08F 2500/12* (2013.01); *C08F 2500/27* (2021.01); *C08F 2500/33* (2021.01); *C08F 2500/34* (2021.01); *C08F 2800/20* (2013.01); *C08L 2201/10* (2013.01); *C08L 2203/30* (2013.01)

(58) Field of Classification Search
CPC .... C08F 210/16; C08F 210/02; C08F 210/06; C08F 2500/27; C08F 2500/12; C08F 2500/34; C08F 2500/33; C08F 2800/20
See application file for complete search history.

(56) References Cited

U.S. PATENT DOCUMENTS

| | | | |
|---|---|---|---|
| 4,552,930 A | 11/1985 | Hirota et al. | |
| 6,441,111 B1 | 8/2002 | Ushioda et al. | |
| 7,910,679 B2 | 3/2011 | Kiss et al. | |
| 8,142,902 B2 * | 3/2012 | Stadlbauer | B29C 48/08 428/513 |
| 9,605,186 B2 * | 3/2017 | Tse | C09J 123/142 |
| 11,485,845 B2 * | 11/2022 | Wang | C08F 210/16 |
| 11,505,686 B2 * | 11/2022 | Gahleitner | C08J 5/18 |
| 2007/0155919 A1 | 7/2007 | Okumura et al. | |
| 2009/0163678 A1 | 6/2009 | Kiss et al. | |
| 2009/0259007 A1 | 10/2009 | Ciaccia | |
| 2010/0243498 A1 | 9/2010 | Sun et al. | |
| 2015/0119539 A1 | 4/2015 | McCullough | |
| 2016/0333125 A1 | 11/2016 | Noh et al. | |
| 2019/0144571 A1 | 5/2019 | Yang et al. | |
| 2019/0270833 A1 | 9/2019 | Chae et al. | |
| 2020/0165428 A1 * | 5/2020 | Herrington | C08K 5/43 |
| 2020/0199165 A1 | 6/2020 | Friederichs et al. | |
| 2021/0147666 A1 * | 5/2021 | Inepekoglou | C08F 210/06 |
| 2022/0185916 A1 | 6/2022 | Kim et al. | |
| 2022/0227901 A1 * | 7/2022 | Wang | C08J 5/18 |
| 2022/0251259 A1 * | 8/2022 | Wang | C08F 2/001 |
| 2023/0257567 A1 * | 8/2023 | Wang | C08J 5/18 525/240 |
| 2023/0406971 A1 * | 12/2023 | Wang | C08L 23/142 |

FOREIGN PATENT DOCUMENTS

| | | | | |
|---|---|---|---|---|
| CN | 1890272 A | | 1/2007 | |
| CN | 101903423 A | | 12/2010 | |
| CN | 103145902 A | * | 6/2013 | |
| EP | 0074194 B1 | | 11/1986 | |
| EP | 1095951 A1 | * | 5/2001 | ............. C07F 17/00 |
| EP | 1179562 A2 | * | 2/2002 | ............. B32B 27/06 |
| EP | 3916022 A1 | * | 12/2021 | ............ B29C 48/154 |
| JP | 2000351879 A | * | 12/2000 | ............. B32B 27/32 |
| JP | 2002088204 A | * | 3/2002 | ............. B32B 27/06 |
| JP | 2002088204 A | | 3/2002 | |
| JP | 2004066565 A | * | 3/2004 | |
| JP | 2007513906 A | | 5/2007 | |
| JP | 2008534706 A | | 8/2008 | |
| JP | 4204676 B2 | * | 1/2009 | ............. A61K 31/23 |
| JP | 2009138113 A | | 6/2009 | |
| JP | 4514248 B2 | * | 7/2010 | ............. B32B 27/32 |
| JP | 2016172714 A | | 9/2016 | |
| JP | 2016172827 A | | 9/2016 | |
| JP | 2022520391 A | | 3/2022 | |
| KR | 20060123293 A | | 12/2006 | |
| KR | 20120000058 A | | 1/2012 | |
| KR | 20150037654 A | | 4/2015 | |

(Continued)

OTHER PUBLICATIONS

Search Report dated Oct. 10, 2022 from Office Action for Chinese Application No. 202080023515.7 issued Oct. 24, 2022. 2 pgs.

(Continued)

*Primary Examiner* — Rip A Lee
(74) *Attorney, Agent, or Firm* — Lerner David LLP

(57) ABSTRACT

The present disclosure relates to a propylene-ethylene random copolymer for high transparency injection that has a low total volatile organic compound emission (TVOC), excellent processability, and maximizing ethylene content.

11 Claims, No Drawings

(56) References Cited

FOREIGN PATENT DOCUMENTS

| KR | 20160061649 A | 6/2016 | | |
|----|---------------|--------|---|---|
| KR | 20160067801 A | 6/2016 | | |
| KR | 20180058249 A | 6/2018 | | |
| KR | 20200109601 A | 9/2020 | | |
| WO | 1999009076 A1 | 2/1999 | | |
| WO | 2005058916 A2 | 6/2005 | | |
| WO | 2015065681 A1 | 5/2015 | | |
| WO | 2018185176 A1 | 10/2018 | | |
| WO | 2019099250 A1 | 5/2019 | | |
| WO | WO-2019215120 A1 * | 11/2019 | ............. | C08F 10/06 |
| WO | 2020184887 A1 | 9/2020 | | |
| WO | WO-2020239561 A1 * | 12/2020 | ............. | B32B 27/08 |

OTHER PUBLICATIONS

Extended European Search Report including Written Opinion for Application No. 20822421.2 dated Apr. 8, 2022, pp. 1-9.
International Search Report for Application No. PCT/KR2020/007547, dated Oct. 7, 2020, 2 pages.

* cited by examiner

PROPYLENE-ETHYLENE RANDOM COPOLYMER

CROSS-REFERENCE TO RELATED APPLICATION(S)

The present application is a national stage entry under 35 U.S.C. § 371 of International Application No. PCT/KR2020/007547 filed on Jun. 11, 2020, which claims priority from Korean Patent Application No. 10-2019-0068772 filed on Jun. 11, 2019, and Korean Patent Application No. 10-2020-0070124 filed on Jun. 10, 2020, the disclosures of which are hereby incorporated by reference herein in their entirety.

TECHNICAL FIELD

The present invention relates to a propylene-ethylene random copolymer.

BACKGROUND

Polypropylene resin is a kind of general resin, which is easy to process and has excellent properties for the cost, so that it has wide spectrum of use, precisely it takes the place of conventional materials such as glass, wood, paper, metal, etc, and also can be applied to the field of other plastic products even including engineering plastic.

Recently, a method of random copolymerizing propylene with ethylene or butene or a method of tertiary copolymerization has been studied for the production of injection-molded products requiring transparency. Among them, it is known that propylene with a higher ethylene content is more effective as the biggest factor for transparency. However, the random copolymerized polypropylene shows a decrease in crystallinity as the content of ethylene increases, which is a comonomer of the polymer, as compared to conventional homo polypropylene. Thus, in the random copolymerized polypropylene, the balance between rigidity and impact strength is not maintained or it is difficult to ensure process stability.

On the other hand, the catalyst for polypropylene polymerization can be largely divided into a Ziegler-Natta-based catalyst and a metallocene-based catalyst. Since the Ziegler-Natta catalyst is a multi-site catalyst in which several active sites are mixed, it is characterized by a wide molecular weight distribution. Also, in the case of using the Ziegler-Natta catalyst, there is a problem in that there is a limitation in securing desired physical properties because the composition distribution of the comonomer is not uniform. In particular, when random copolymerization with ethylene is performed to ensure transparency in the presence of a Ziegler-Natta catalyst (Z/N, ziegler-natta), the polymerizability of ethylene is very high, so it is a non-uniform polymer, that is, a polymer in which an ethylene polymer is formed as a block between propylene polymers, rather than a repeating structure. Thus, in the case of using the Ziegler-Natta catalyst for random copolymerization with ethylene, physical properties are greatly reduced, and there is a problem in that the emission of volatile organic compounds (VOC) is high.

However, the metallocene catalyst includes a combination of a main catalyst having a transition metal compound as a main component and a cocatalyst of an organometallic compound having aluminum as a main component. Such a catalyst is a single-site catalyst which is a homogeneous complex catalyst, and offers a polymer having a narrow molecular weight distribution and a uniform composition distribution of comonomers due to the single site characteristics. Further, a variety of properties such as the stereoregularity, copolymerizing properties, molecular weight, or crystallinity regarding the resulting polymer may be controlled by changing a ligand structure of the catalyst and polymerization conditions.

In particular, products applied with Ziegler-Natta catalyst are the mainstream in the case of various commercially available polypropylenes. Recently, many product groups seek to reduce the generation of volatile organic compounds (VOCs) due to a recent change in environmental awareness. Accordingly, as an eco-friendly material for food containers, the conversion to polypropylene resin products using metallocene catalysts with low odor and low elution properties is accelerating.

However, when polypropylene is produced using the conventional metallocene catalyst, the melting point of polypropylene prepared using the conventional metallocene catalyst is lower than that the polypropylene prepared using the Ziegler-Natta catalyst. Then, in case of using the conventional metallocene catalyst, there is a limitation in increasing the content of ethylene as a comonomer. Therefore, in injection products, it is difficult to achieve high transparency while lowering crystallization.

Accordingly, it is required to develop a method for producing highly transparent polypropylene useful for injection products by maximizing ethylene content as well as achieving a low total volatile organic compound emission (TVOC) by using a metallocene-based catalyst.

DETAILED DESCRIPTION OF THE INVENTION

Technical Problem

In the present disclosure, there is provided a propylene-ethylene random copolymer for high transparency injection using a high comonomer content while generating a low total volatile organic compound emission (TVOC).

Technical Solution

In the present disclosure, there is provided a propylene-ethylene random copolymer, satisfying the following conditions of a melting point (Tm) of 125° C. or higher, an ethylene content of 4.0% by weight or more, a crystallization temperature (Tc) of 75° C. or lower, and a melt index ($MI_{2.16}$, melt index measured at 230° C., 2.16 kg load) of 16 g/10 min to 22 g/10 min.

The propylene-ethylene random copolymer may have a melting point (Tm) of 125° C. to 150° C., an ethylene content of 4.0% by weight to 5.5% by weight, and a crystallization temperature (Tc) of 65° C. to 75° C.

Further, the propylene-ethylene random copolymer may have a xylene soluble content (X·S) of 1.0% by weight or less.

Further, the propylene-ethylene random copolymer may have a haze of 7.5% or less, measured according to American Society for Testing and Materials, ASTM D 1003 method and a total volatile organic compound emission (TVOC) of 70 ppm or less, measured according to the VDA 277 method;

Meanwhile, the propylene-ethylene random copolymer may be prepared by copolymerizing a propylene monomer and an ethylene comonomer in the presence of a catalyst composition including a metallocene compound of the following Chemical Formula 1:

[Chemical Formula 1]

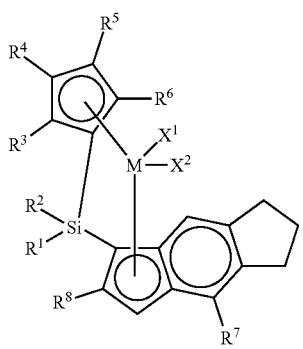

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is substituted or unsubstituted $C_{6-20}$ aryl, and $R^8$ is $C_{1-20}$ alkyl.

Here, in Chemical Formula 1, the $R^1$ and $R^2$ may be each independently $C_{1-8}$ linear or branched alkyl, or $C_{2-12}$ linear or branched alkoxyalkyl. In particular, the $R^1$ and $R^2$ may be each independently methyl, ethyl, propyl, isopropyl, butyl, isobutyl, t-butyl, hexyl, or t-butoxyhexyl.

In Chemical Formula 1, the $R^3$ to $R^6$ may be each independently $C_{1-6}$ linear or branched alkyl, or $C_{1-3}$ linear or branched alkyl. In particular, the $R^3$ to $R^6$ may be each independently methyl, ethyl, propyl, or isopropyl, preferably methyl.

Also, in Chemical Formula 1, the M may be preferably zirconium (Zr) or hafnium (Hf).

In Chemical Formula 1, the $R^7$ may be phenyl, phenyl substituted with $C_{1-6}$ linear or branched alkyl, naphthyl, or naphthyl substituted with $C_{1-6}$ linear or branched alkyl. Specifically, one or two or more of the hydrogen in the phenyl or naphthyl of the $R^7$ may be substituted with $C_{1-6}$ linear or branched alkyl. For example, one or two or more of the hydrogen in the phenyl or naphthyl of the $R^7$ may be substituted with methyl, ethyl, propyl, isopropyl, butyl, isobutyl, or t-butyl, respectively.

Further, in Chemical Formula 1, the $R^8$ may be $C_{1-6}$ linear or branched alkyl, or $C_{1-3}$ linear or branched alkyl. In particular, the $R^8$ may be methyl, ethyl, or propyl, or isopropyl, preferably methyl.

Specifically, the metallocene compound of Chemical Formula 1 may be preferably represented by the following Chemical Formula 1-1:

[Chemical Formula 1-1]

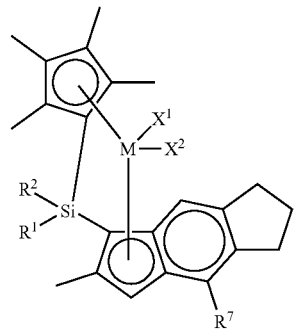

in Chemical Formula 1-1,

M, $X^1$, $X^2$, $R^1$, $R^2$, and $R^7$ are as defined in Chemical Formula 1.

For example, the metallocene compound represented by Chemical Formula 1 may be any one of compounds represented by the following structural formulae. The following structural formula are shown by way of examples and will be described in detail. However, it is not intended to limit the present invention to the particular form disclosed.

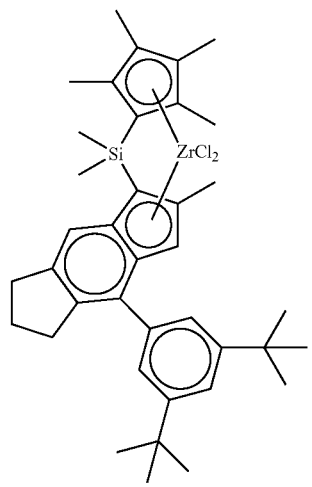

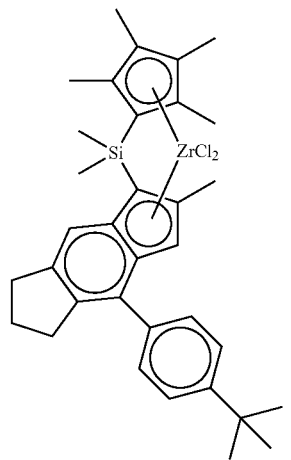 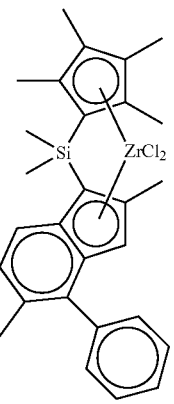

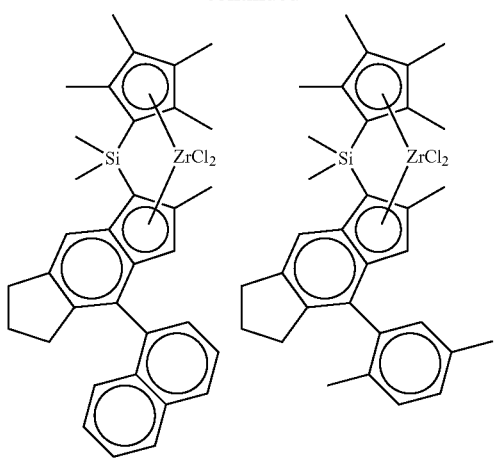
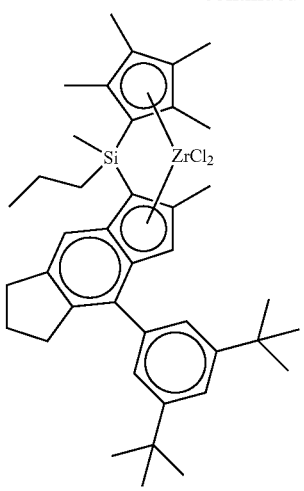
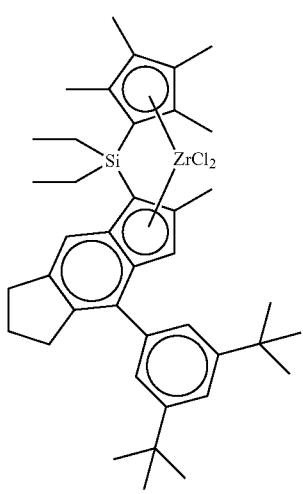
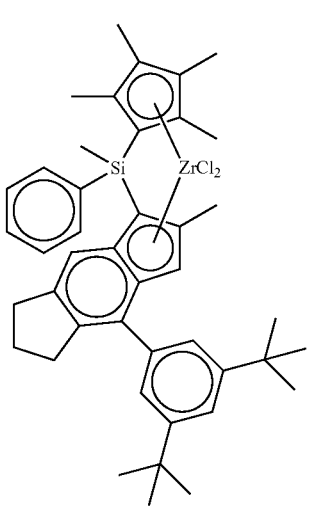
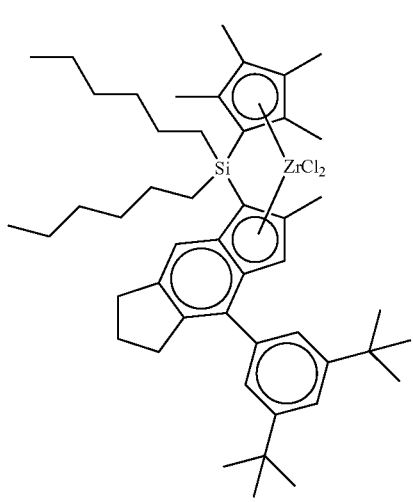
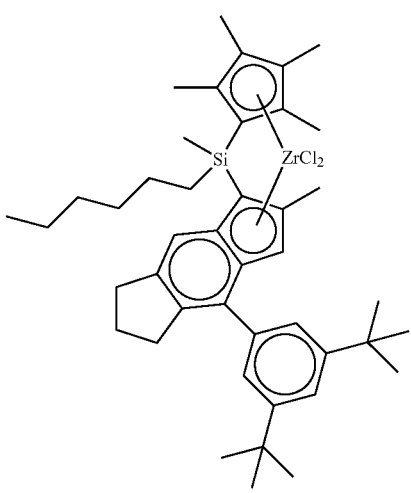

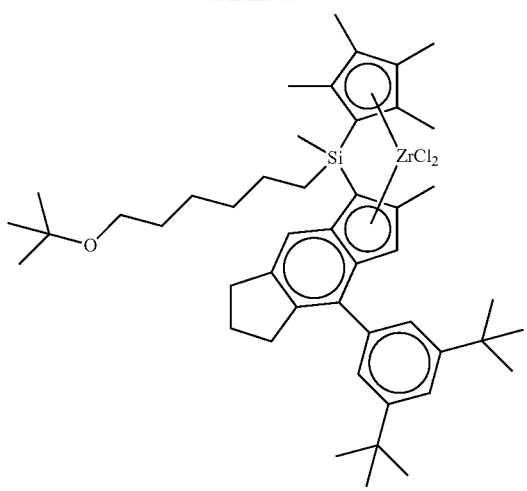

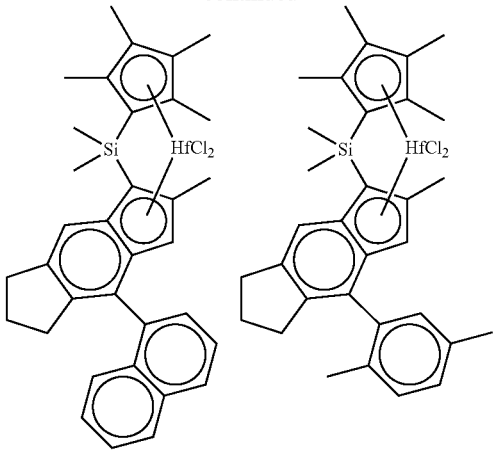

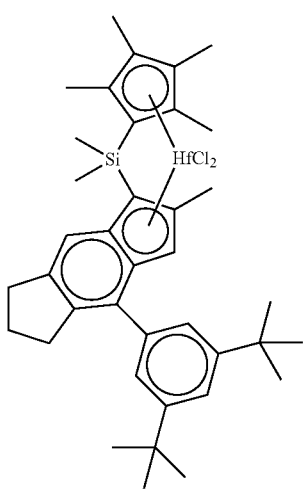

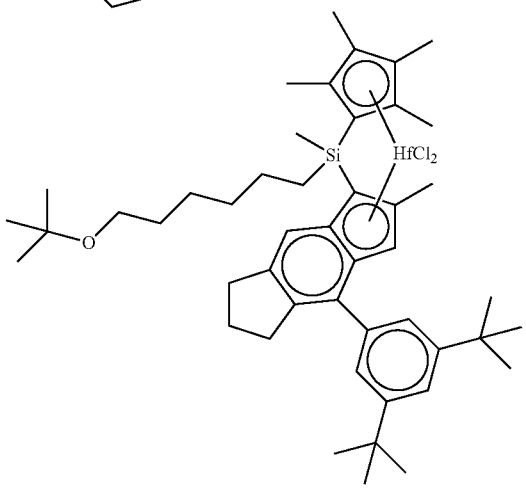

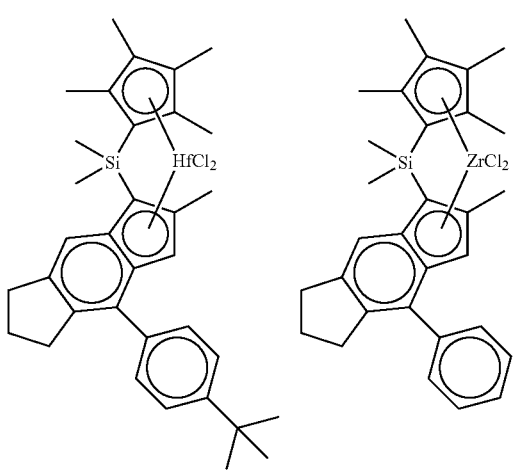

The terminology used herein is for the purpose of describing particular embodiments only and is not intended to be limiting of the invention.

The singular forms are intended to include the plural forms as well, unless the context clearly indicates otherwise.

It will be further understood that the terms "include", "have", or "possess" specify the presence of stated features, numbers, steps, components, or combinations thereof, but do not preclude the presence or addition of one or more other features, numbers, steps, components, or combinations thereof.

Also, as used herein, in case a layer or an element is mentioned to be formed "on" another layer or element, it means that the layer or element is directly formed on another layer or element, or it means that other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to an aspect of the present disclosure, a propylene-ethylene random copolymer is characterized by satisfying the following conditions of a melting point (Tm) of 125° C. or higher, an ethylene content of 4.0% by weight or more, a crystallization temperature (Tc) of 75° C. or lower, and a melt index ($MI_{2.16}$, melt index measured at 230° C., 2.16 kg load) of 16 g/10 min to 22 g/10 min.

The propylene (co)polymer prepared by the Ziegler-Natta catalyst has a problem in that the volatile organic compound emission (VOC) is high as well as the rigidity is greatly reduced due to the decrease in crystal properties. In addition, since the melting point of the polymer is low and the fouling occurs in the polymerization process, when using the conventional metallocene catalyst, and then there is a limit in increasing the content of ethylene as a comonomer. Thus, it is necessary to increase the ethylene content to maintain high transparency and improve processability to be suitable for injection molding.

Accordingly, according to the present disclosure, it is possible to provide a propylene-ethylene random copolymer for preparing a high transparency injection product having high rigidity, excellent processability, and a low total volatile organic compound emission (TVOC).

Specifically, the present disclosure provides a random copolymerized polypropylene, particularly, a propylene-ethylene random copolymer comprising ethylene as a comonomer. On the other hand, in the case of a random copolymer using butene instead of ethylene as a comonomer or the terpolymer using butene with ethylene as a comonomer, the haze value is not good. Thus, the random copolymer comprising butene as a comonomer is difficult to prepare a high-transparency resin for injection unlike the resin composition of the present disclosure.

The propylene-ethylene random copolymer according to an embodiment of the present disclosure is characterized in that the content of ethylene is 4.0 wt % or more at a melting point (Tm) of 120° C. or higher. In particular, the propylene-ethylene random copolymer of the present disclosure may be prepared by using uses a metallocene catalyst having a novel structure as described below. Thereby, the propylene-ethylene random copolymer of the present disclosure may secure a very high melting point in the resin of homopolypropylene and a high copolymerizability with ethylene. Then, the propylene-ethylene random copolymer of the present disclosure maintains a high melting point even with such a high ethylene content.

Specifically, the propylene-ethylene random copolymer according to an embodiment of the present disclosure may have a melting point (Tm) of 125° C. or higher or 125° C. to 150° C. By having such a high melting point, a fouling phenomenon does not appear in the polymerization process, and excellent processability and heat resistance can be exhibited. More specifically, the propylene-ethylene random copolymer may have a melting point (Tm) of 125.1° C. or higher or 125.1° C. to 150° C.

In addition, the propylene-ethylene random copolymer may have a crystallization temperature (Tc) of 75° C. or lower or 65° C. to 75° C. Since the crystallinity is lowered due to such a low crystallinity temperature, when applied to an injection product such as a film, it has a low haze value and high transparency can be secured. More specifically, the propylene-ethylene random copolymer may have a crystallization temperature (Tc) of 74.5° C. or lower, or 65° C. to 74.5° C.; or 74° C. or lower, or 68° C. to 74° C.; or 73.8° C. or lower, or 70° C. to 73.8° C.

In the present disclosure, the melting point (Tm) and crystallization temperature (Tc) may be measured using a differential scanning calorimeter (DSC, device name: DSC 2920, manufacturer: TA instrument). In detail, the polypropylene polymer is heated to 200° C. by increasing the temperature, and then maintained at the same temperature for 5 minutes, followed by lowering the temperature to 30° C. Then, the temperature is increased again, and the temperature corresponding to a peak in the DSC (Differential Scanning calorimeter, manufactured by TA) curve is determined as the melting point (Tm). Thereafter, when the temperature is lowered to 30° C. again, the top of the curve is taken as the crystallization temperature (Tc). In this regard, the temperature is increased and decreased at a rate of 10° C./min, respectively, and the melting point (Tm) the crystallization temperature (Tc) are a result measured at a second temperature increase and decrease section.

In addition, in the propylene-ethylene random copolymer according to an embodiment of the present disclosure, as described above, the content of ethylene at a melting point (Tm) of 125° C. or higher may be 4.0 wt % or more or 4.0 wt % to 5.5 wt %. As described above, by maintaining a high melting point and increasing the ethylene content, it has a low haze value and high transparency can be secured when applied to injection products such as films. More specifically, the propylene-ethylene random copolymer may have an ethylene content of 4.1 wt % or more, or 4.1 wt % to 5.5 wt %; or 4.2 wt % or more, or 4.2 wt % to 5.5 wt %.

In general, when a propylene-ethylene random copolymer is prepared using a comonomer in a conventional manner, a heterogeneous comonomer enters between the main chains to modify the lamellar structure of the resin. As a result, the melting point (Tm) of the conventional propylene-ethylene random copolymer is lowered so that it is difficult to maintain the balance between rigidity and impact strength and to secure process stability. In contrast, in the present disclosure, by using a metallocene catalyst having a novel structure as described below, a very high melting point can be secured in case of the resin of homopolypropylene and high copolymerizability with ethylene can be implemented. Thus, even with a high ethylene content as described above, the propylene-ethylene random copolymer of the present disclosure may exhibit improved physical properties while maintaining a high melting point of 125° C. or higher.

Meanwhile, in the present disclosure, the comonomer content in the propylene-ethylene random copolymer may be determined according to American Society for Testing and Materials, ASTM D 5576 by fixing a film or a film-shaped specimen of the propylene random copolymer to a magnetic holder of FT-IR instrument, measuring the height of a peak in 4800 $cm^{-1}$ to 3500 $cm^{-1}$ reflecting a thickness of the specimen and the area of a peak in 710 $cm^{-1}$ to 760 $cm^{-1}$ indicating the ethylene component from IR absorption spectrum, and then substituting the measured values into Calibration Equation obtained by plotting a value obtained by dividing the area of a peak in 710 $cm^{-1}$ to 760 $cm^{-1}$ by the height of a peak in 4800 $cm^{-1}$ to 3500 $cm^{-1}$ of a standard sample.

On the other hand, the propylene-ethylene random copolymer according to an embodiment of the present disclosure has a melt index ($MI_{2.16}$) of about 16 g/10 min to about 22 g/10 min, which is measured at 230° C. under a load of 2.16 kg according to the American Society for Testing and Materials standard, ASTM D 1238. By optimizing the range of the melt index as above, it is possible to obtain a highly transparent product while maintaining excellent processability during injection molding. More specifically, the propylene-ethylene random copolymer of the present disclosure may have a melt index ($MI_{2.16}$) of about 17 g/10 min to about 21 g/10 min, or about 18 g/10 min to about 20 g/10 min. In particular, when the melt index ($MI_{2.16}$) of the propylene-ethylene random copolymer is less than about 16 g/10 min, the processability is poor and the injection pressure increases so that it is difficult for injection molding. In contrast, when the melt index ($MI_{2.16}$) of the propylene-ethylene random copolymer is more than about 22 g/10 min, it cannot be used as a resin for injection because the viscosity is too low to flow down and not to be injected.

As described above, the propylene-ethylene random copolymer of the present disclosure maintains a high ethylene content of 4.0 wt % or more with a melting point (Tm) of 125° C. or higher, and secures the low crystallinity temperature (Tc) of 75° C. or lower and the optimized melt index ($MI_{2.16}$, melt index measured at 230° C. under 2.16 kg load) of 16 g/10 min to 22 g/10 min, unlike a polypropylene prepared using the conventional Ziegler-Natta catalyst or the conventional metallocene catalyst. Thus, the propylene-ethylene random copolymer of the present disclosure may secure excellent processability during polymerization and injection molding. In addition, according to the propylene-ethylene random copolymer of the present disclosure, the total volatile organic compound emission (TVOC) is low, and high rigidity and high transparency can be exhibited.

For example, in the propylene-ethylene random copolymer according to an embodiment of the present disclosure, the xylene soluble content (XS) may be about 1.0% by weight or less, or about 0.85% by weight or less, or about 0.7% by weight or less. The xylene soluble content is a value indicating the content of the atactic component in the entire copolymer. It means that the lower xylene soluble content, as describe above, the lower the sticky degree of the propylene-ethylene random copolymer. This is an advantage that can be secured in polymerization using a metallocene catalyst. Thus, the propylene-ethylene random copolymer according to the present disclosure is characterized by a very low possibility of process defects occurring during processing and heat sealing process due to a low content of dissolved in xylene.

In addition, the propylene-ethylene random copolymer has a haze of about 7.5% or less, or about 7.3% or less, or about 7.2% or less, measured according to the ASTM D 1003 method of the American Society for Testing and Materials, indicating high transparency.

The propylene-ethylene random copolymer may have a total volatile organic compound emission (TVOC) of about 70 ppm or less, or about 65 ppm or less, or about 60 ppm or less, measured according to the VDA 277 method. By having such a low total volatile organic compound emission (TVOC), it is possible to secure eco-friendliness as a propylene-ethylene random copolymer for a transparent injection product used in food containers and the like.

As described above, the propylene-ethylene random copolymer of the present disclosure can secure high rigidity and excellent transparency as well as superior process stability and processability than those of a polypropylene prepared using conventional Ziegler-Natta catalyst or conventional metallocene catalyst.

Meanwhile, the propylene random copolymer according to an embodiment of the present disclosure having the above physical properties and structural characteristics may be prepared by copolymerizing a propylene monomer and an ethylene comonomer in the presence of a catalyst composition including a metallocene compound of the following Chemical Formula 1 as a catalytically active component:

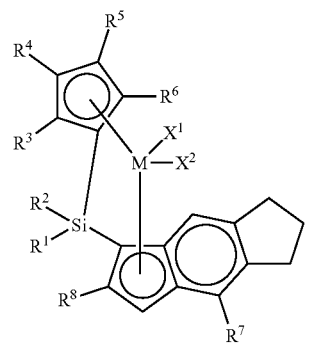

[Chemical Formula 1]

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is substituted or unsubstituted $C_{6-20}$ aryl, and $R^8$ is $C_{1-20}$ alkyl.

Unless otherwise specified herein, following terms may be defined as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, or the like, but is not limited thereto.

The $C_{2-20}$ alkenyl may be linear, branched, or cyclic alkenyl. Specifically, it may be allyl, ethenyl, propenyl, butenyl, pentenyl, or the like, but is not limited thereto.

The $C_{1-20}$ alkoxy may be methoxy, ethoxy, isopropoxy, n-butoxy, tert-butoxy, pentoxy, cyclohexyloxy, or the like, but is not limited thereto.

The $C_{2-20}$ alkoxyalkyl group is a functional group in which at least one hydrogen of the above-mentioned alkyl is substituted with alkoxy, and it may be alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, and tert-butoxyhexyl; aryloxyalkyl such as phenoxyhexyl; or the like, but is not limited thereto.

The $C_{1-20}$ alkylsilyl or the $C_{1-20}$ alkoxysilyl is a functional group in which 1 to 3 hydrogens of —$SiH_3$ are substituted with 1 to 3 alkyl groups or alkoxy groups described above, and it may be alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; or the like, but is not limited thereto.

The $C_{1-20}$ silylalkyl is a functional group in which at least one hydrogen of the above-mentioned alkyl is substituted with silyl, and it may be —CH$_2$—SiH$_3$, methylsilylmethyl or dimethylethoxysilylpropyl, or the like, but is not limited thereto.

In addition, the C$_{1-20}$ alkylene is the same as the above-mentioned alkyl except that it is a divalent substituent, and it may be methylene, ethylene, propylene, butylene, pentylene, hexylene, heptylene, octylene, cyclopropylene, cyclobutylene, cyclopentylene, cyclohexylene, cycloheptylene, cyclooctylene, or the like, but is not limited thereto.

The C$_{6-20}$ aryl may be a monocyclic, bicyclic or tricyclic aromatic hydrocarbon. For example, the C$_{6-20}$ aryl may be phenyl, biphenyl, naphthyl, anthracenyl, phenanthrenyl, fluorenyl, or the like, but is not limited thereto.

The C$_{7-20}$ alkylaryl may refer to a substituent in which at least one hydrogen of the aromatic ring is substituted with the above-mentioned alkyl. For example, the C$_{7-20}$ alkylaryl may be methylphenyl, ethylphenyl, methylbiphenyl, methylnaphthyl, or the like, but is not limited thereto.

The C$_{7-20}$ arylalkyl may refer to a substituent in which at least one hydrogen of the alkyl is substituted with the above-mentioned aryl. For example, the C$_{7-20}$ arylalkyl may be phenylmethyl, phenylethyl, biphenylmethyl, naphthylmethyl, or the like, but is not limited thereto.

In addition, the C$_{6-20}$ arylene is the same as the above-mentioned aryl except that it is a divalent substituent, and it may be phenylene, biphenylene, naphthylene, anthracenylene, phenanthrenylene, fluorenylene, or the like, but is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

The catalyst composition used for preparing a propylene-ethylene random copolymer according to an embodiment of the present disclosure includes the compound of Chemical Formula 1 as a single metallocene catalyst. Accordingly, the molecular weight distribution of the propylene-ethylene random copolymer of the present disclosures may be significantly narrower than that of a propylene copolymer prepared using a mixture having two or more catalysts in the conventional manner. Therefore, the rigidity of the propylene-ethylene random copolymer of the present disclosures may be improved.

Meanwhile, the metallocene compound has an asymmetric structure in which cyclopentadienyl-based groups different from each other are linked by a bridge as a ligand as shown in Chemical Formula 1 above.

Specifically, in Chemical Formula 1, a cyclopentadienyl group substituted with an alkyl group is linked to a bridge on the upper part of the ligand, and an indacenyl structure having a specific substituent is linked to the bridge on the lower part of the ligand.

According to the specific structure described above, the metallocene compound may have various characteristics of the two different cyclopentadienyl-based rings or may selectively take the advantages, thereby exhibiting better catalytic activity.

Specifically, as a hydrogen functional group is substituted with an alkyl group in the cyclopentadienyl structure, the cyclopentadienyl structure plays an important role in maintaining tacticity which is important for propylene polymerization. The maintenance of a steric spatial arrangement during preparing polypropylene induces an isotactic polymer to grow with maintaining high activity. In the case of cyclopentadienyl (Cp) which is substituted only with hydrogen, there is no bulky portion. Thus, when the propylene is inserted, the catalyst faces in a completely open state, so that the tacticity collapses to form atactic polypropylene (atactic PP).

In addition, when propylene (C3) and H$_2$ are reacted together, the reaction occurs competitively. When a structure is substituted at position 2 in the indacenyl structure of the ligand of Chemical Formula 1, for example, when R$^8$ is substituted with C$_{1-20}$ alkyl, a specific steric arrangement is given to the metal center, and thus, reactivity of H$_2$, which is smaller than C3, is improved. Accordingly, when R$^8$ at position 2 in the indacenyl structure is substituted with C$_{1-20}$ alkyl, such as methyl, hydrogen reactivity can be increased in the polymerization process.

Further, an aryl substituent capable of giving electrons abundantly is substituted at position 4 in the indacenyl structure, and thus electrons are abundantly given to a metal atom included in the bridge structure of Chemical Formula 1, resulting in higher catalytic activity. Herein, an example of the aryl substituent may be a C$_{6-20}$ aryl substituent in which R$^7$ is a substituted or unsubstituted C$_{6-20}$ aryl.

In particular, the indacenyl ligand in the metallocene compound represented by Chemical Formula 1 can provide a very excellent effect for the active part in combination with cyclopentadienyl ligand, rather than the indenyl ligand. This is since, in the steric effect of cyclopentadienyl structures, it is possible to secure a flat structure that the indacenyl ligand faces to cyclopentadieny ligand, rather than the case of applying indenyl ligand with cyclopentadienyl ligand. Thus, the indacenyl structure seems to act very favorably on the activation of the propylene monomer by influencing the active site. This result can be confirmed by an increase in the tacticity of the polymerized polypropylene.

As describe above, as the metallocene compound represented by Chemical Formula 1 is in a form where two ligands are linked by a bridge group and provides electrons to the transition metal, it may have high structural stability and high polymerization activity even when supported on a support.

In Chemical Formula 1, M may preferably be zirconium (Zr) or hafnium (Hf).

Further, in Chemical Formula 1, each of the R$^1$ and R$^2$ may be C$_{1-8}$ linear or branched alkyl, or C$_{2-12}$ linear or branched alkoxyalkyl. Specifically, it may be methyl, ethyl, propyl, isopropyl, butyl, isobutyl, t-butyl, hexyl, or t-butoxyhexyl.

In Chemical Formula 1, each of the R$^3$ to R$^6$ may be C$_{1-6}$ linear or branched alkyl, or C$_{1-3}$ linear or branched alkyl. Specifically, it may be methyl, ethyl, propyl, or isopropyl, and methyl is preferable.

In addition, in Chemical Formula 1, R$^7$ may be phenyl, phenyl substituted with C$_{1-6}$ linear or branched alkyl, naphthyl, or naphthyl substituted with C$_{1-6}$ linear or branched alkyl. Specifically, the phenyl or naphthyl may be the one in which one or two or more of hydrogen are each substituted with C$_{1-6}$ linear or branched alkyl. For example, the phenyl or naphthyl of $R^7$ may be the one in which one or two or more of hydrogen are each substituted with methyl, ethyl, propyl, isopropyl, butyl, isobutyl, or t-butyl.

The substituent at each position of the aromatic group can supply sufficient electrons to the aromatic group by an inductive effect, and increase the overall size of the metallocene compound. Moreover, an available angle may be increased and monomers may be easily accessed, thereby exhibiting better catalytic activity.

In Chemical Formula 1, $R^8$ may be $C_{1-6}$ linear or branched alkyl, or $C_{1-3}$ linear or branched alkyl. Specifically, it may be methyl, ethyl, or propyl, and methyl is preferable.

In addition, the metallocene compound. represented by the Chemical Formula 1 may be, for example, represented by the following Chemical Formula 1-1.

[Chemical Formula 1-1]

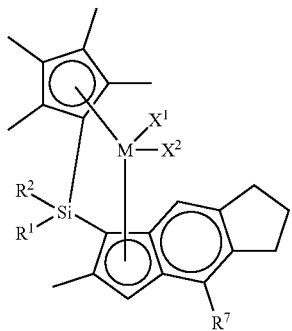

in Chemical Formula 1-1, M, $X^1$, $X^2$, $R^1$, $R^2$, and $R^7$ are as defined in Chemical Formula 1.

In addition, the compound represented by the Chemical Formula 1 may be, for example, any one of compounds represented by the following structural formulae.

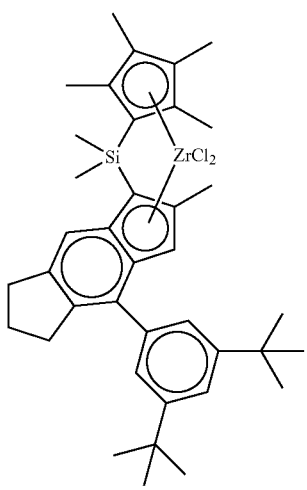

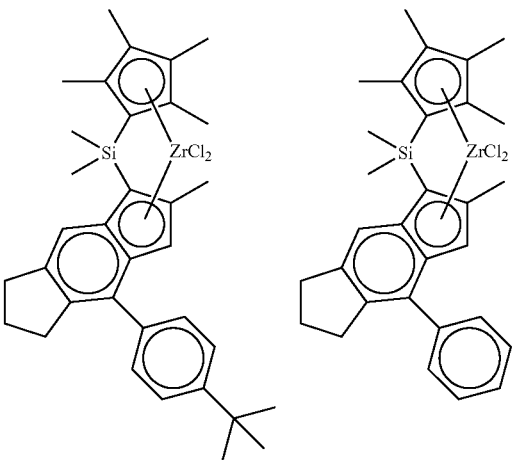

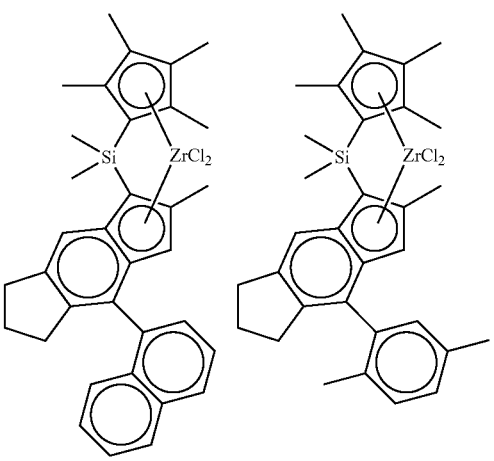

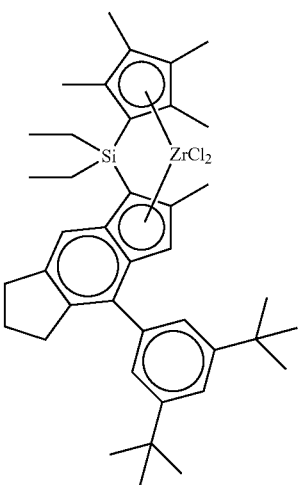

-continued
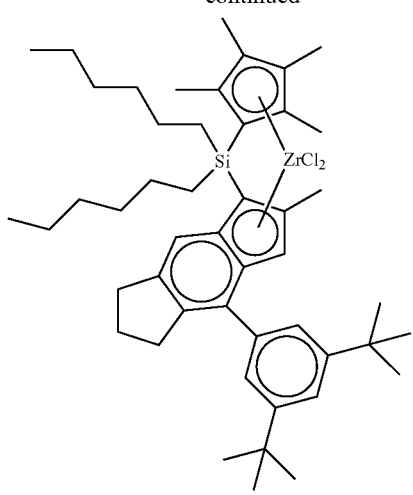
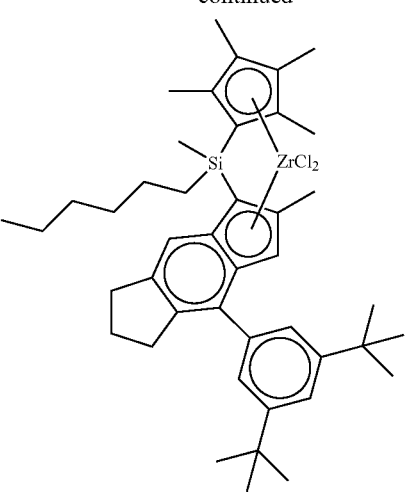
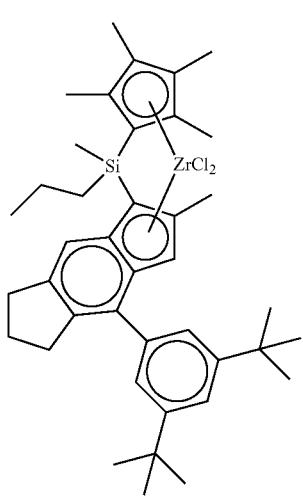
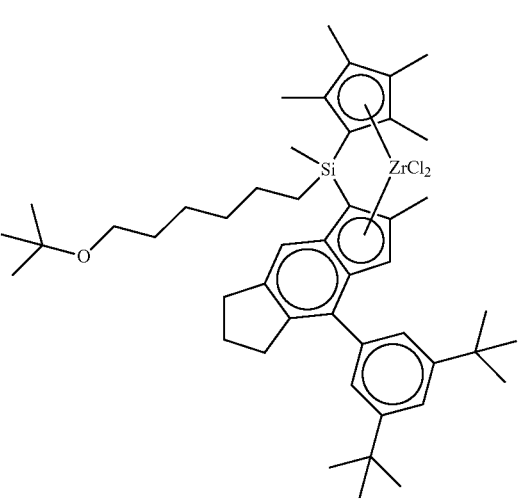
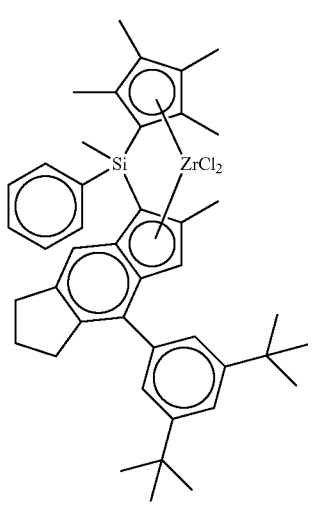
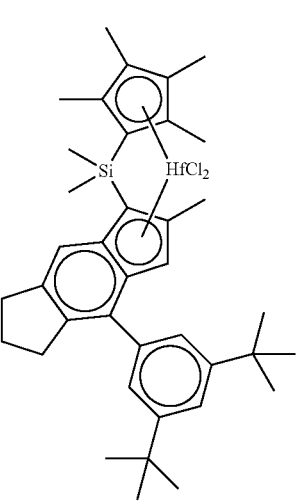

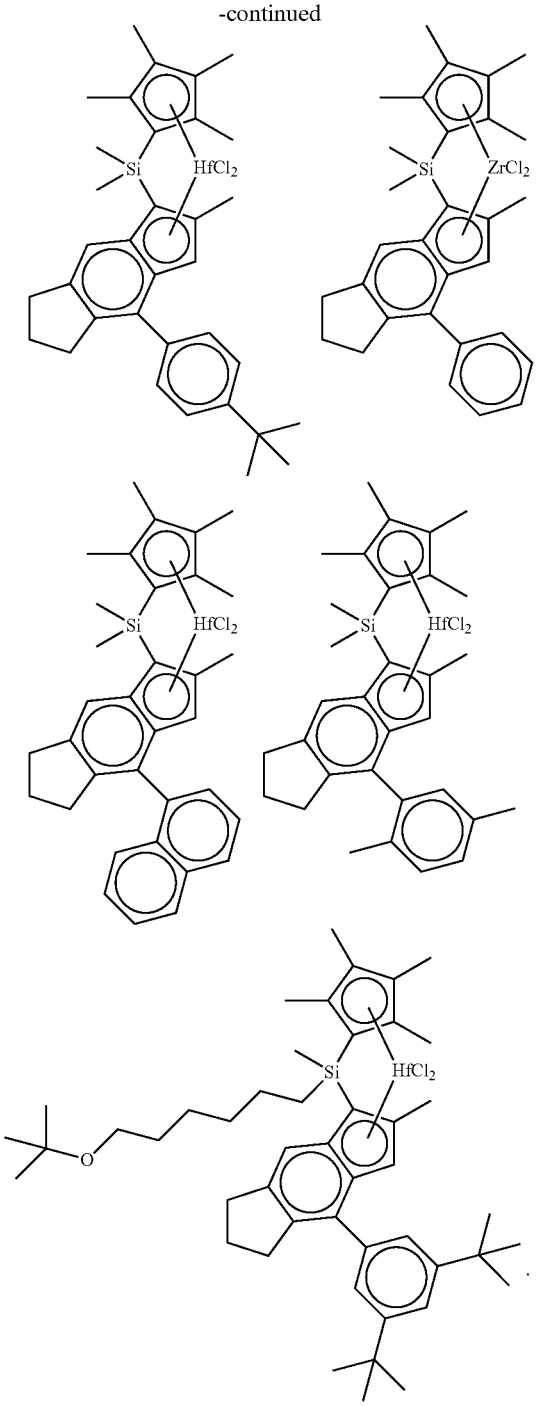

The metallocene compound represented by Chemical Formula 1 may be prepared by a known method for synthesizing an organic compound, and a more detailed synthesis method may be referred to the following Synthesis Examples.

In the method for preparing the metallocene compound or catalyst composition of the present disclosure, the equivalent (eq) refers to a molar equivalent (eq/mol).

The metallocene catalyst used in the present disclosure may be used in the form of a supported metallocene catalyst by supporting the metallocene compound represented by Formula 1 on a carrier together with a cocatalyst.

In the supported metallocene catalyst according to the present disclosure, the cocatalyst supported together on the carrier to activate the metallocene compound may be an organometallic compound containing a Group 13 metal. However, it is not particularly limited as long as it can be used when polymerizing olefins under a general metallocene catalyst.

Specifically, the cocatalyst may include at least one compound represented by the following Chemical Formula 2.

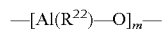  [Chemical Formula 2]

in Chemical Formula 2, $R^{22}$ are the same as or different from each other, and are each independently halogen, $C_{1-20}$ alkyl, or $C_{1-20}$ haloalkyl; and m is an integer of 2 or more.

The cocatalyst, as described above, may be used to further improve polymerization activity.

For example, the cocatalyst of Formula 2 may be an alkylaluminoxane-based compound to which repeating units are bound in a linear, circular or network form. Specifically, the examples of such a cocatalyst include methyl aluminoxane (MAO), ethyl aluminoxane, isobutyl aluminoxane or butyl aluminoxane.

In the supported metallocene catalyst according to the present disclosure, the ratio of the total transition metal to the carrier included in the metallocene compound represented by Formula 1 may be 1:10 to 1:1000 by weight. When the carrier and the metallocene compound are included in the above weight ratio, an optimal shape may be exhibited. In addition, the weight ratio of the cocatalyst to the carrier may be 1:1 to 1:100.

In the present disclosure, the supported metallocene catalyst may comprise a carrier containing a hydroxyl group on the surface. The carrier may be preferably dried to remove moisture from the surface. Also, the carrier may have a hydroxyl group and a siloxane group with high reactivity.

For example, the carrier may be silica dried at a high temperature, silica-alumina, silica-magnesia, and the like. Further, the carrier may typically contain oxide, carbonate, sulfate, or nitrate components such as $Na_2O$, $K_2CO_3$, $BaSO_4$, or $Mg(NO_3)_2$.

The drying temperature of the carrier may be preferably 200° C. to 800° C., more preferably 300° C. to 600° C., and further preferably 300° C. to 400° C. When the drying temperature of the carrier is less than 200° C., there may be too much moisture on the surface of the carrier. Thereby, there may be problems by the reaction between surface moisture and the co-catalyst. On the other hand, when the drying temperature of the carrier is higher than 800° C., the surface area may be reduced as the pores on the surface of the carrier may be merged. Also, a large number of hydroxyl groups may be lost on the surface and only siloxane groups may remain, which is not preferable because the reaction site with the co-catalyst decreases.

The amount of hydroxyl groups on the surface of the carrier is preferably 0.1 mmol/g to 10 mmol/g, more preferably 0.5 mmol/g to 5 mmol/g. The amount of hydroxyl groups on the surface of the carrier can be controlled by the methods and the conditions for preparing the carrier, and the drying conditions of the carrier, such as temperature, time, vacuum, or spray drying.

If the amount of the hydroxyl group is less than 0.1 mmol/g, there are few reaction sites with the co-catalyst. In contrast, if the amount of the hydroxyl group exceeds 10 mmol/g, it is not preferable because it may be caused by moisture other than the hydroxyl group present on the surface of the carrier particle.

Meanwhile, the propylene-ethylene random copolymer according to the present disclosure can be prepared by copolymerizing a monomer and a comonomer in the presence of the above-described metallocene catalyst.

The polymerization reaction may be carried out by copolymerizing the propylene monomer and the comonomer by contacting them using one continuous slurry polymerization reactor, a loop slurry reactor, a gas phase reactor or a solution reactor.

In addition, the polymerization temperature may be from about 25° C. to about 500° C., preferably from about 25° C. to about 200° C., more preferably from about 50° C. to about 100° C. Further, the polymerization pressure may be from about 1 kgf/cm² to about 100 kgf/cm², preferably from about 1 kgf/cm² to about 50 kgf/cm², more preferably from about 10 kgf/cm² to about 40 kgf/cm².

In addition, the polymerization reaction may be carried out in the presence of hydrogen gas, specifically, hydrogen gas of about 350 ppm or less, or about 0 to about 350 ppm; or about 300 ppm or less, or about 0 ppm to about 300 ppm; or about 250 ppm or less, or about 0 ppm to about 250 ppm; or about 200 ppm or less, or about 0 ppm to about 200 ppm, based on the propylene monomer content. For example, depending on the metallocene compound of the supported catalyst, the amount of the hydrogen gas is at least 50 ppm or more, or 100 ppm or more, or about 100 ppm or more, or 120 ppm or more, or 150 ppm or more, in the above-mentioned content range.

The supported metallocene catalyst may be injected by dissolving or diluting in an aliphatic hydrocarbon solvent having 5 to 12 carbon atoms, for example, pentane, hexane, heptane, nonane, decane, or isomers thereof; or aromatic hydrocarbon solvents such as toluene or benzene, or a hydrocarbon solvent substituted with a chlorine atom, such as dichloromethane or chlorobenzene. The solvent used in the present disclosure may be preferably used by pretreating a small amount of alkyl aluminum to remove a small amount of water or air acting as a catalyst poison, and it is also possible to further use a cocatalyst.

As described above, the propylene-ethylene random copolymer according to the present disclosure may be prepared by copolymerizing propylene and ethylene using the above-described supported metallocene catalyst. As a result, the propylene-ethylene random copolymer maintains a high melting point even with an increased ethylene content, and secures a low crystallization temperature and an appropriate melting index. Thus, the propylene-ethylene random copolymer of the present disclosure may secure excellent processability during polymerization and injection molding. In addition, according to the propylene-ethylene random copolymer of the present disclosure, the total volatile organic compound emission (TVOC) is low, and high rigidity and high transparency can be exhibited. Therefore, the propylene-ethylene random copolymer according to the present disclosure can be preferably applied to products for high-transparency thin film injection, an eco-friendly material.

Advantageous Effects

The propylene-ethylene random copolymer according to the present disclosure can maintain a high melting point even with an increased ethylene content, and secure a low crystallization temperature and an appropriate melting index. Thus, the propylene-ethylene random copolymer of the present disclosure may secure excellent processability during polymerization and injection molding. In addition, according to the propylene-ethylene random copolymer of the present disclosure, the total volatile organic compound emission (TVOC) is low, and high rigidity and high transparency can be exhibited. Therefore, the propylene-ethylene random copolymer according to the present disclosure is advantageous for manufacturing highly transparent injection products used as eco-friendly materials.

DETAILED DESCRIPTION OF THE EMBODIMENTS

Hereinafter, the actions and effects of the present invention will be described in more detail with reference to the specific exemplary embodiments. However, these exemplary embodiments are provided only for illustrating the present invention, and the scope of the present invention is not limited thereto.

EXAMPLES

Preparation of Metallocene Compound

Synthesis Example 1

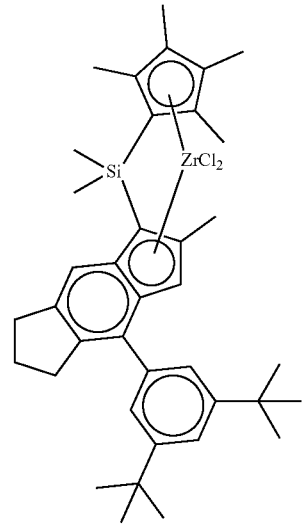

Preparation of Ligand Compound (2-methyl-4-(3', 5'-ditertbutylphenyl)Indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (Silane, 1.05 eq) was added thereto at −10° C., and stirred overnight at room temperature. In another reactor, 2-methyl-4-(3',5'-ditertbutylphenyl) indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

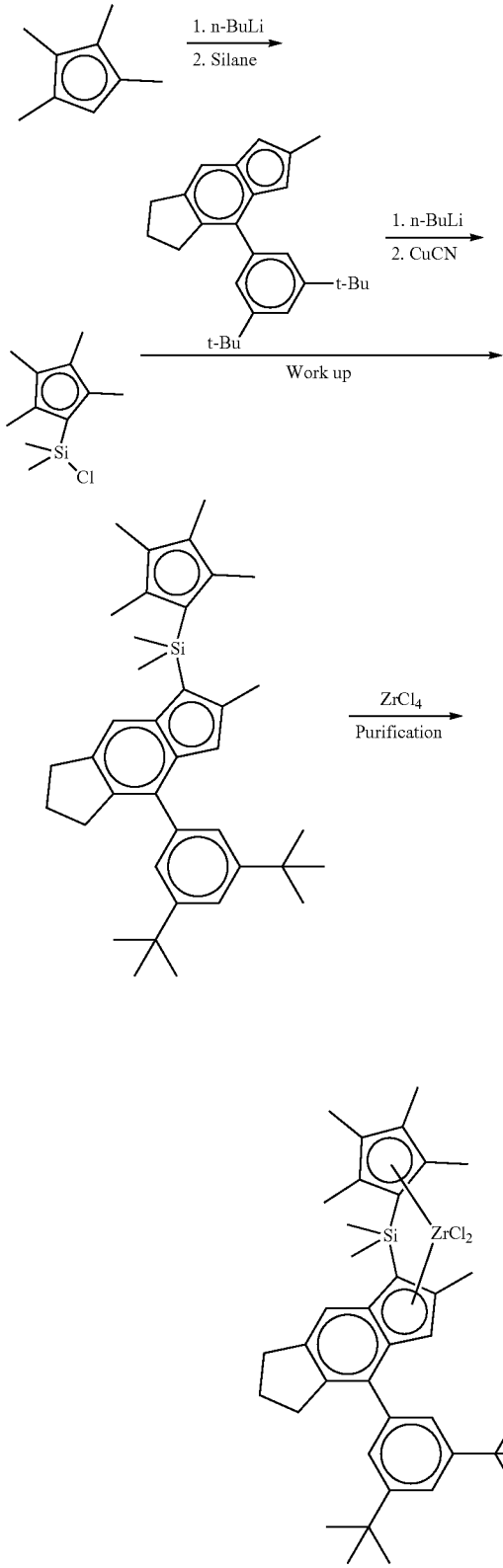

Preparation of Transition Metal Compound dimethylsilanediyl(2-methyl-4-(3',5'-ditertbutylphenyl) Indacenyl) (2,3,4,5-tetramethyl cyclopentadienyl) zirconium dichloride The ligand prepared above was dissolved in a mixed solution of toluene/diethyether (Toluene/Ether, 2/1 by volume, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

For the transition metal compound prepared above, NMR data were measured with Bruker AVANCE III HD 500 MHz NMR/PABBO (1H/19F/Broad band) probe: 1H, and solvent: $CDCl_3$.

$^1$H-NMR (500 MHz, $CDCl_3$): 7.73 (s, 2H), 7.56 (s, 1H), 7.42 (s, 1H), 6.36 (s, 1H), 2.85-2.80 (m, 4H), 2.12 (s, 6H), 1.95 (m, 2H), 1.79 (s, 9H), 1.31 (s, 18H), 1.00 (s, 6H) ppm.

Synthesis Example 2

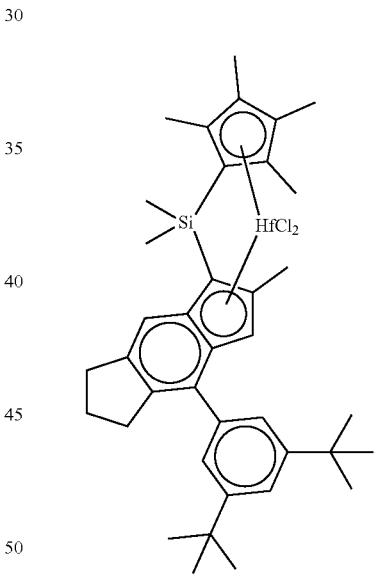

Preparation of Ligand Compound (2-methyl-4-(3', 5'-ditertbutylphenyl)Indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (Silane, 1.05 eq) was added thereto at −10° C., and stirred overnight at room temperature. In another reactor, 2-methyl-4-(3',5'-ditertbutylphenyl) indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

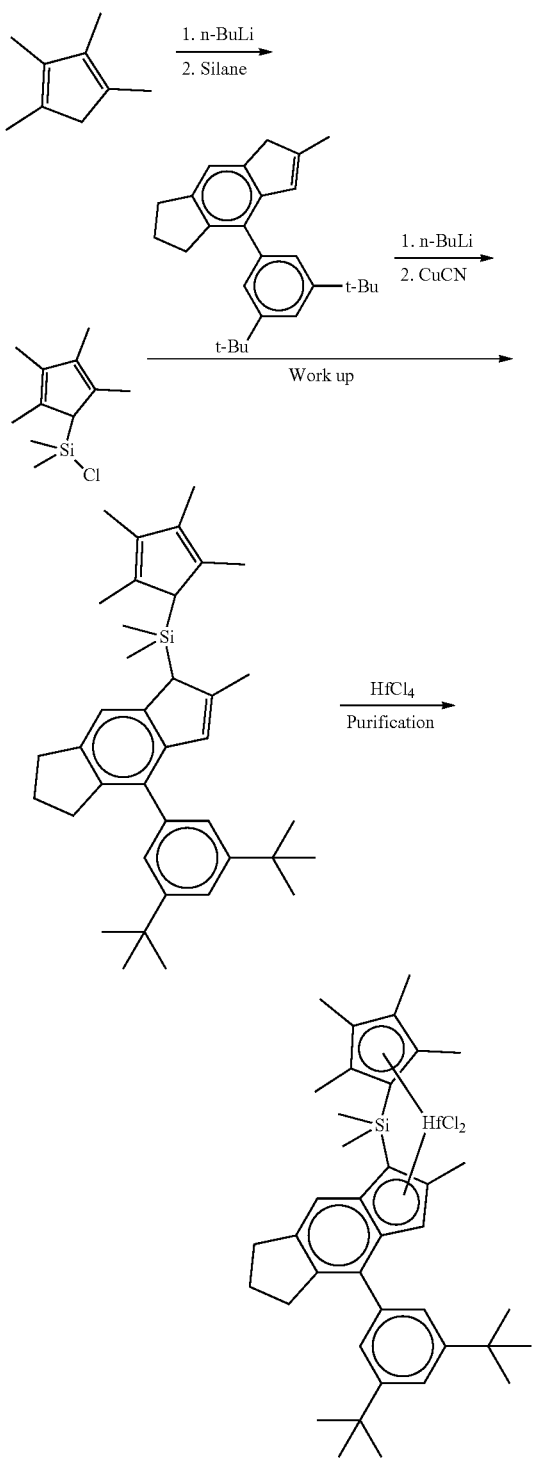

Preparation of Transition Metal Compound dimethylsilanediyl(2-methyl-4-(3',5'-ditertbutylphenyl) indacenyl) (2,3,4,5-tetramethyl cyclopentadienyl) hafnium dichloride The ligand prepared above was dissolved in a mixed solution of Toluene/Ether, 2/1 by volume, 0.53 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.78 (s, 2H), 7.6 (s, 1H), 7.46 (s, 1H), 6.41 (s, 1H), 2.98-2.92 (m, 4H), 2.14 (s, 6H), 1.98 (m, 2H), 1.83 (s, 6H), 1.8 (s, 3H), 1.33 (s, 18H), 1.28 (s, 6H) ppm.

Synthesis Example 3

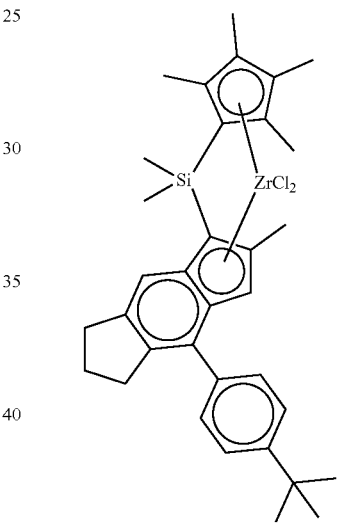

Preparation of Ligand Compound (2-methyl-4-(4'-tertbutylphenyl)Indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-tetrabutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

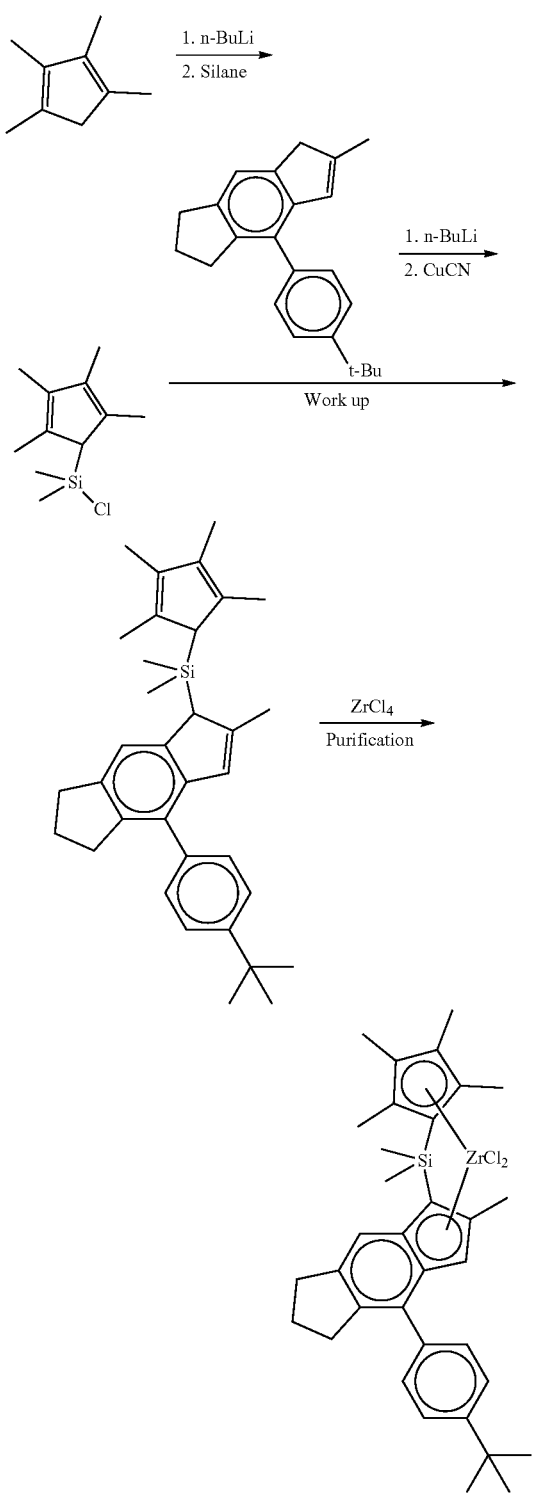

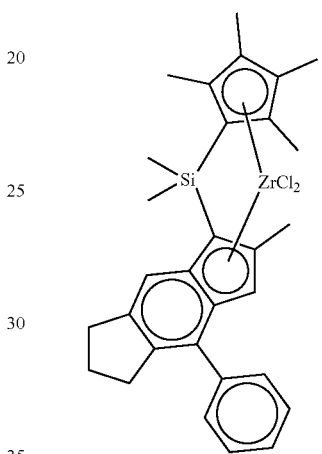

overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.42 (s, 1H), 7.38 (d, 2H), 7.30 (d, 2H), 6.37 (s, 1H), 2.85-2.79 (m, 4H), 2.12 (s, 6H), 1.94 (m, 2H), 1.79 (s, 9H), 1.30 (s, 9H), 1.00 (s, 6H) ppm.

Synthesis Example 4

Preparation of Ligand Compound
(2-methyl-4-phenylIndacenyl) dimethyl
(2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, (2-methyl-4-phenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound dimethylsilanediyl(2-methyl-4-(4'-tertbutylphenyl)Indacenyl)(2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl$_4$ (1 eq) with toluene (0.17 M) in a separate flask, and added to the ligand solution, followed by stirring

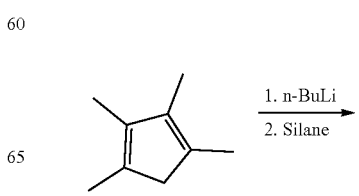

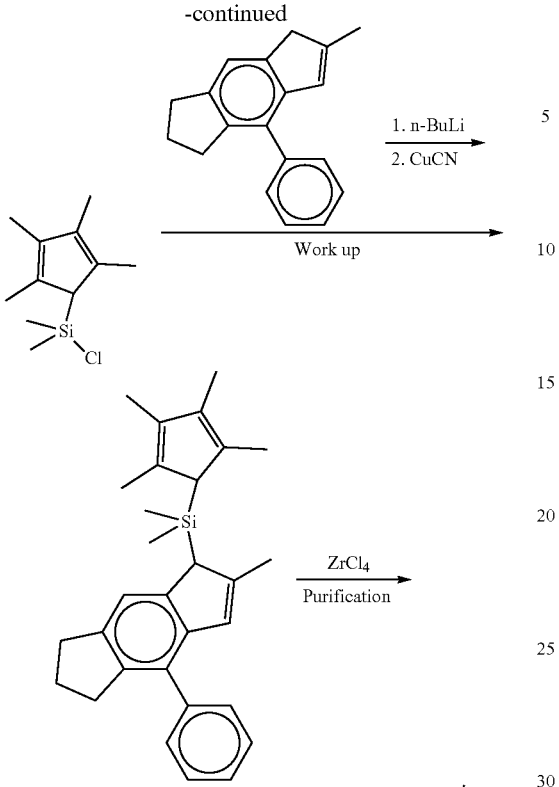

Preparation of Transition Metal Compound dimethylsilanediyl(2-Methyl-4-phenylIndacenyl)(2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.54-7.38 (m, 6H), 6.37 (s, 1H), 2.85-2.80 (m, 4H), 2.12 (s, 6H), 1.95 (m, 2H), 1.79 (s, 9H), 0.99 (s, 6H) ppm.

Synthesis Example 5

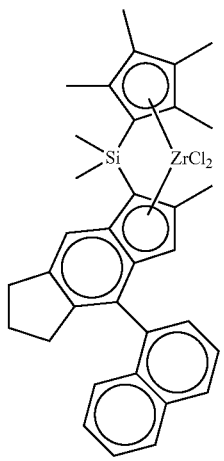

Preparation of Ligand Compound (2-methyl-4-(2'-naphthylene) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2'-naphthylene) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

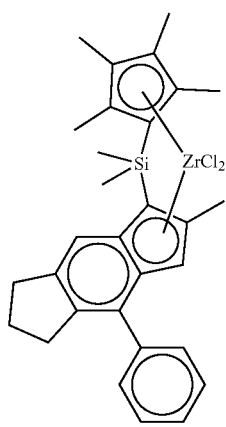

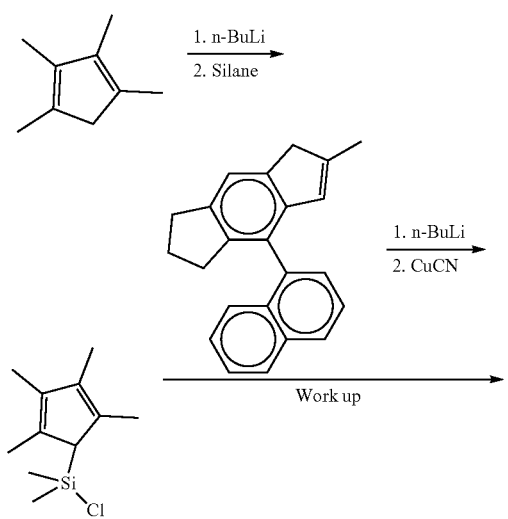

-continued

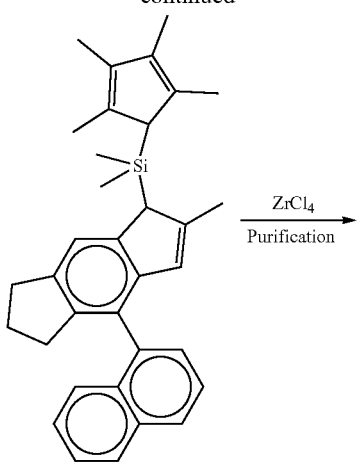

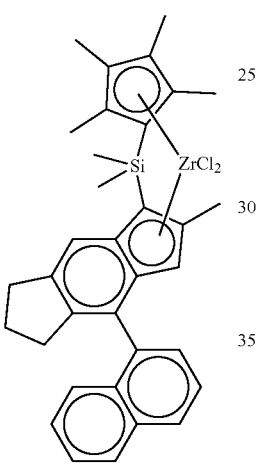

Preparation of Transition Metal Compound dimethylsilanediyl(2-methyl-4-(2'-naphthylene) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 8.80 (d, 1H), 8.50 (d, 1H), 8.2-8.05 (m, 2H), 7.75 (t, 1H), 7.55-7.36 (m, 3H), 6.36 (s, 1H), 2.85-2.81 (m, 4H), 2.13 (s, 6H), 1.95 (m, 2H), 1.8 (s, 6H), 1.78 (s, 3H), 1.01 (s, 6H) ppm.

Synthesis Example 6

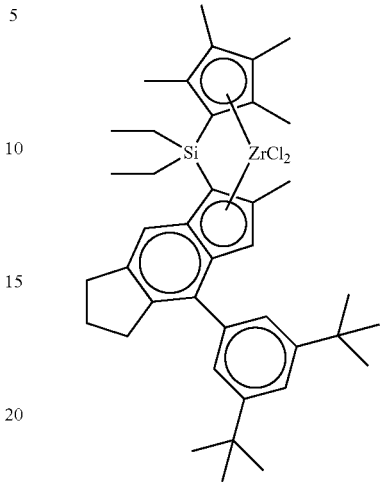

Preparation of Ligand Compound (2-methyl-4-(3', 5'-ditertbutylphenyl) indacenyl) diethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro diethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

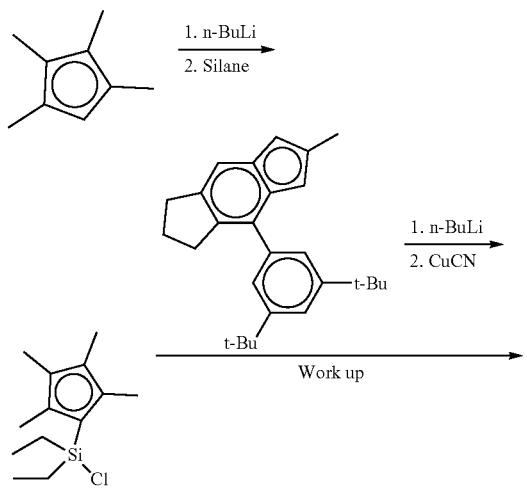

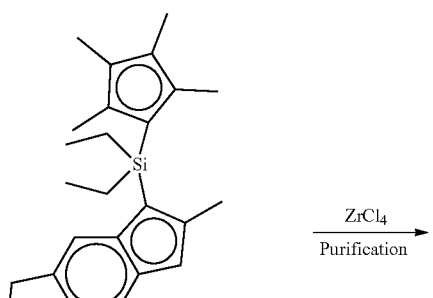

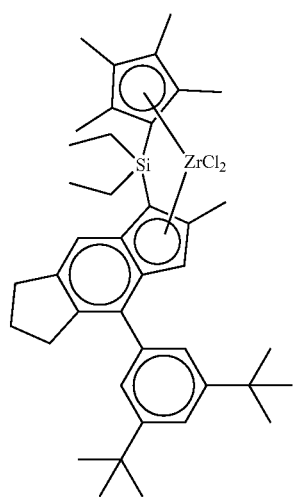

Preparation of Transition Metal Compound diethylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

¹H-NMR (500 MHz, CDCl₃): 7.73 (s, 2H), 7.55 (s, 1H), 7.41 (s, 1H), 6.38 (s, 1H), 2.86-2.80 (m, 4H), 2.12 (s, 6H), 1.95 (m, 2H), 1.79 (s, 9H), 1.28 (t, 6H), 0.94 (m, 4H) ppm.

Synthesis Example 7

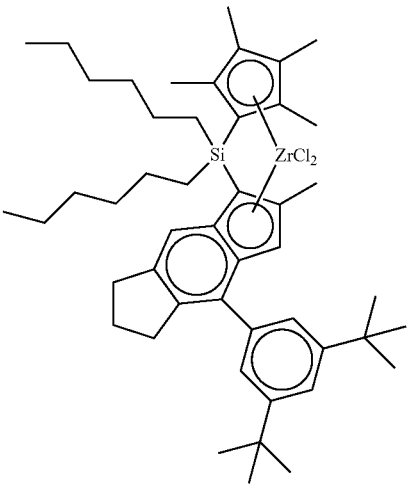

Preparation of Ligand Compound (2-methyl-4-(3', 5'-di(ter-tbutyl)phenyl) indacenyl) dihexyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dihexyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

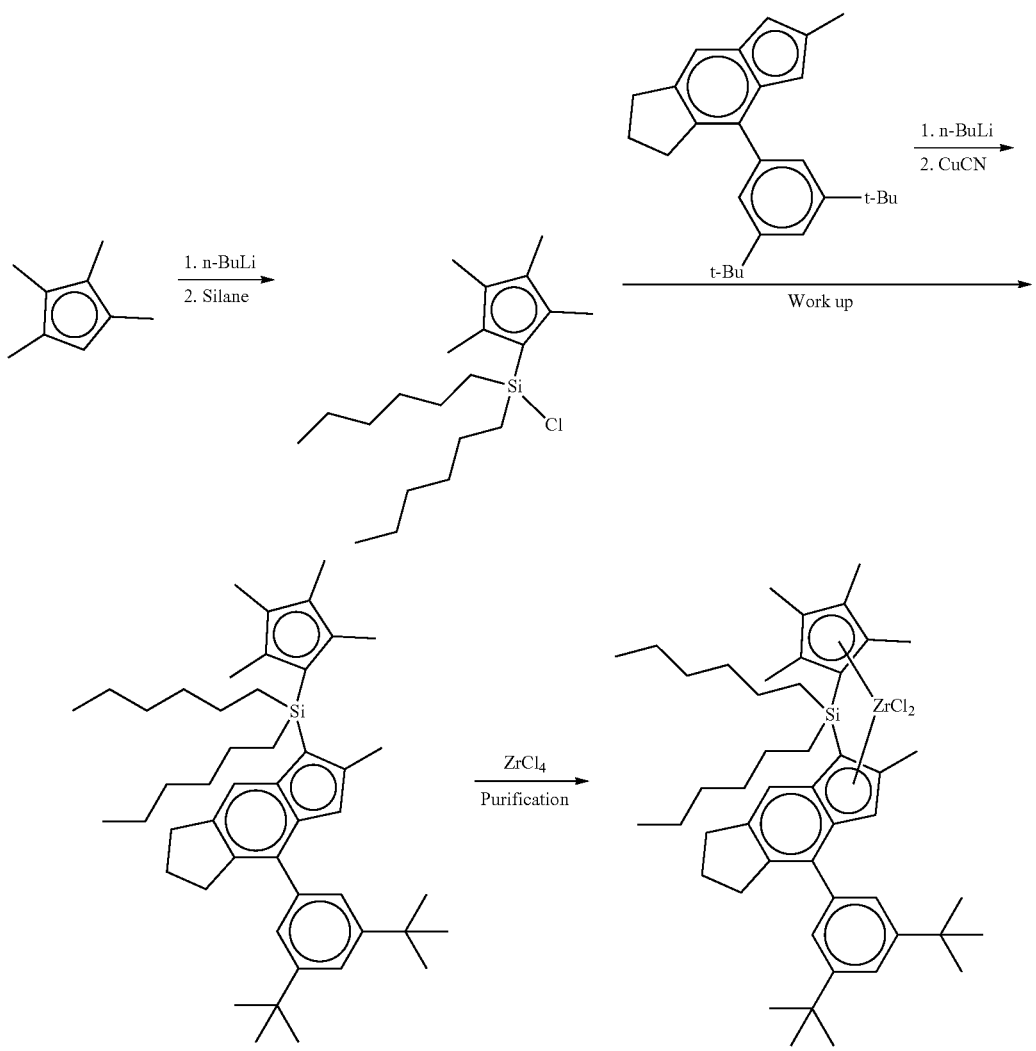

Preparation of Transition Metal Compound dihexyl-silanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, $CDCl_3$): 7.73 (s, 2H), 7.55 (s, 1H), 7.42 (s, 1H), 6.36 (s, 1H), 2.85-2.80 (m, 4H), 2.13 (s, 6H), 1.95 (m, 2H), 1.79 (s, 9H), 1.31 (s, 18H), 1.00-0.84 (m, 10H) ppm.

Synthesis Example 9

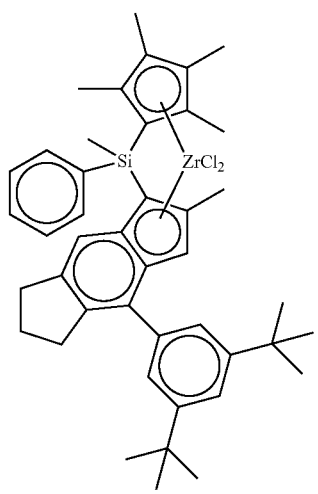

Preparation of Ligand Compound (2-methyl-4-(3', 5'-ditertbutylphenyl) indacenyl) methylphenyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro methylphenyl silane (1.05 eq) was added thereto at −10° C., and stirred overnight at room temperature. In another reactor, 2-methyl-4-(3',5'-ditert-butylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

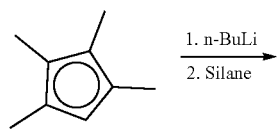

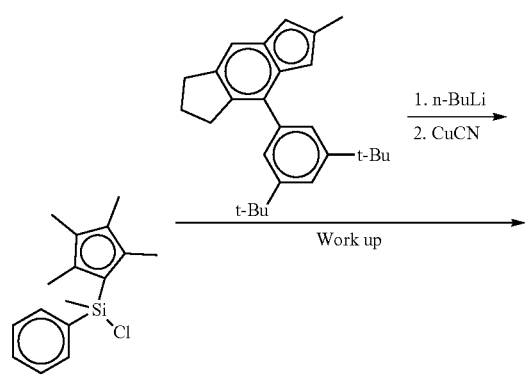

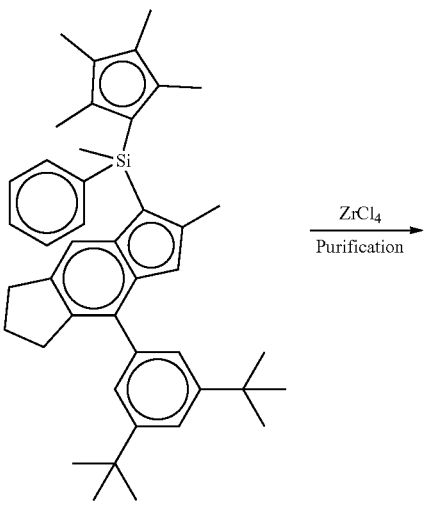

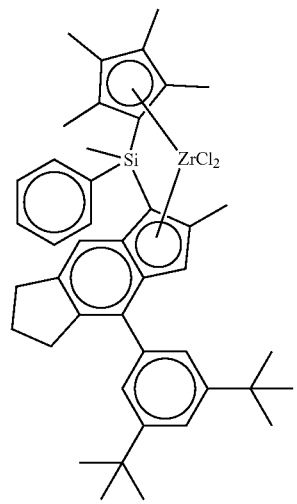

Preparation of Transition Metal Compound methylphenylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.73 (s, 2H), 7.56 (s, 1H), 7.42-7.28 (m, 6H), 6.38 (s, 1H), 2.88-2.82 (m, 4H), 2.12 (s, 6H), 1.95 (m, 2H), 1.79 (s, 9H), 1.31 (s, 18H), 0.98 (s, 3H) ppm.

Synthesis Example 10

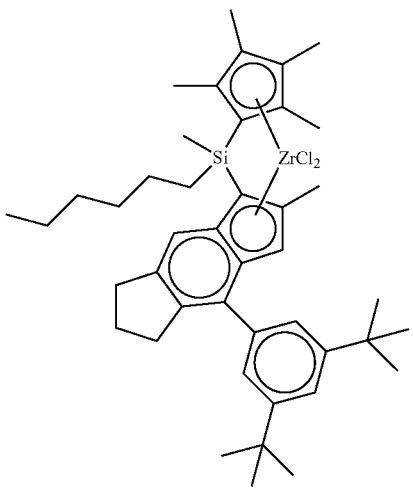

Preparation of Ligand Compound (2-methyl-4-(3', 5'-ditertbutylphenyl) indacenyl) methylhexyl (2,3,4, 5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro methylhexyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

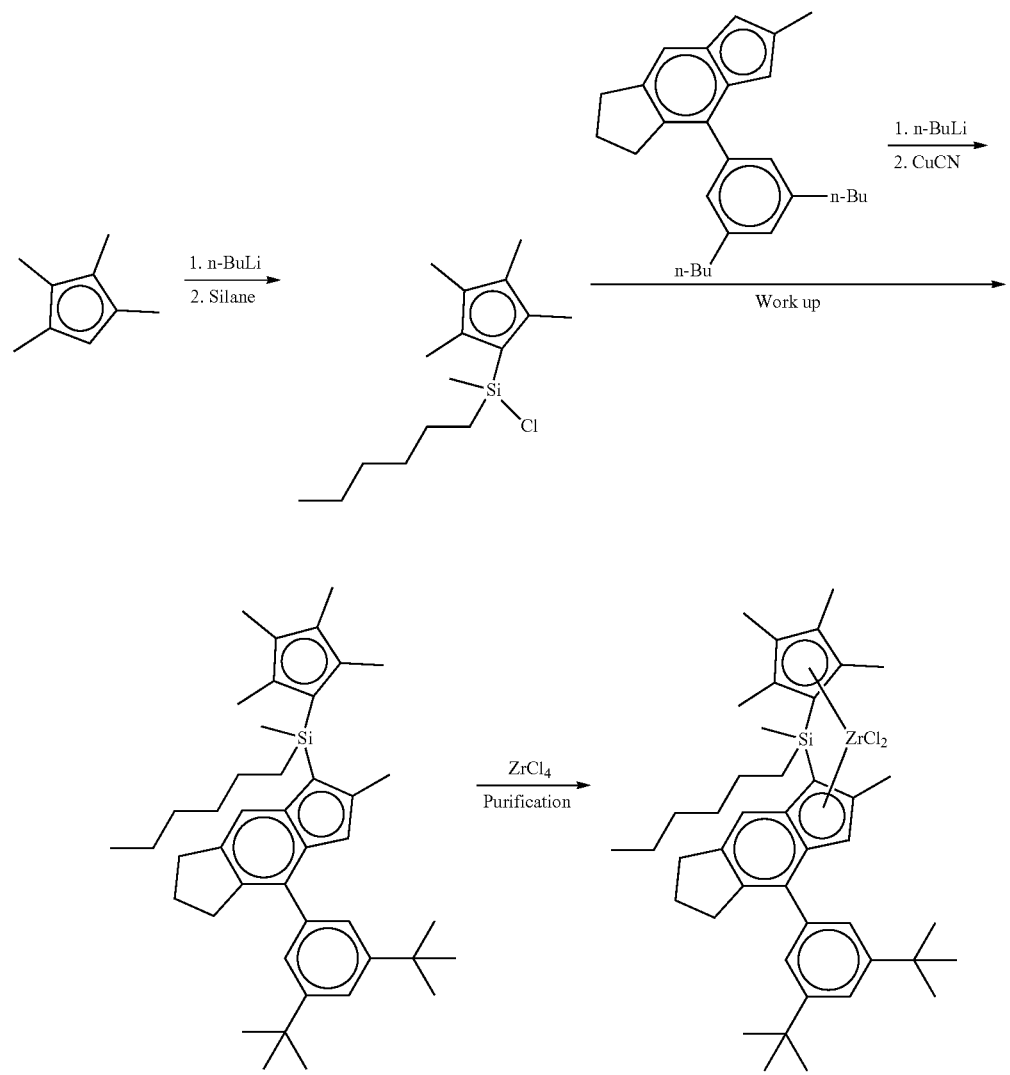

Preparation of Transition Metal Compound methyl-hexylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.74 (s, 2H), 7.55 (s, 1H), 7.41 (s, 1H), 6.35 (s, 1H), 2.85-2.77 (m, 4H), 2.12 (s, 6H), 1.95 (m, 2H), 1.80 (s, 6H), 1.78 (s, 3H), 1.31 (s, 18H), 1.20-0.81 (m, 16H) ppm.

Synthesis Example 11

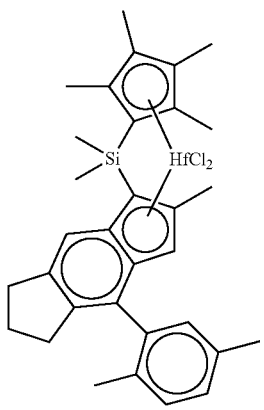

Preparation of Ligand Compound (2-methyl-4-(2',5'-dimethylphenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2',5'-dimethylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

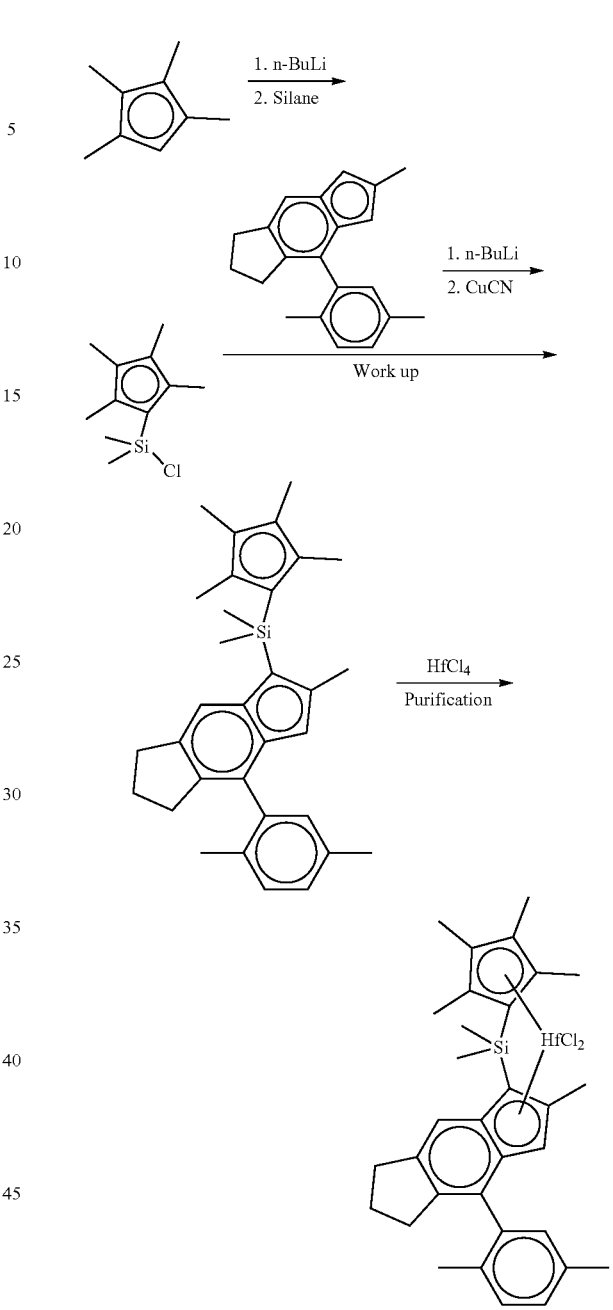

Preparation of Transition Metal Compound dimethylsilanediyl(2-methyl-4-(2',5'-dimethylphenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.76 (s, 1H), 7.54 (s, 1H), 7.35-7.25 (m, 2H), 6.41 (s, 1H), 2.89-2.83 (m, 4H), 2.48 (s, 3H), 2.3 (s, 3H), 2.18 (s, 6H), 1.98 (m, 2H), 1.83 (s, 6H), 1.84 (s, 3H), 1.25 (s, 6H) ppm.

Synthesis Example 12

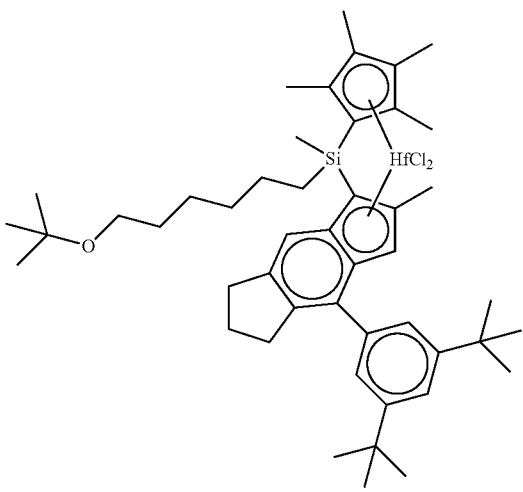

Preparation of Ligand Compound (2-methyl-4-(3', 5'-ditertbutylphenyl) indacenyl) 6-(tert-butoxy)-hexylmethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro 6-(tert-butoxy)-hexylmethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

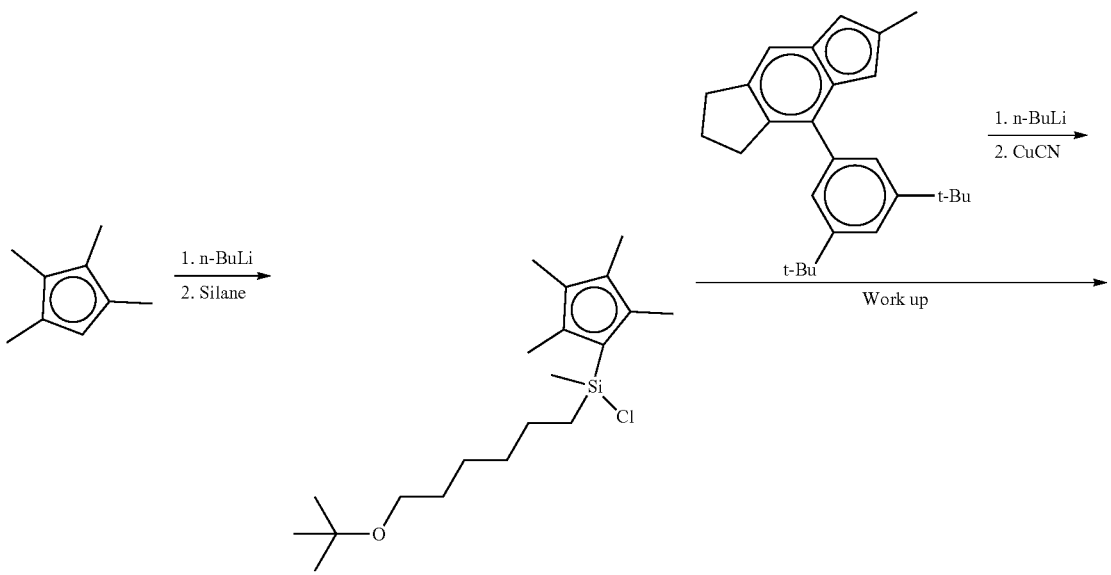

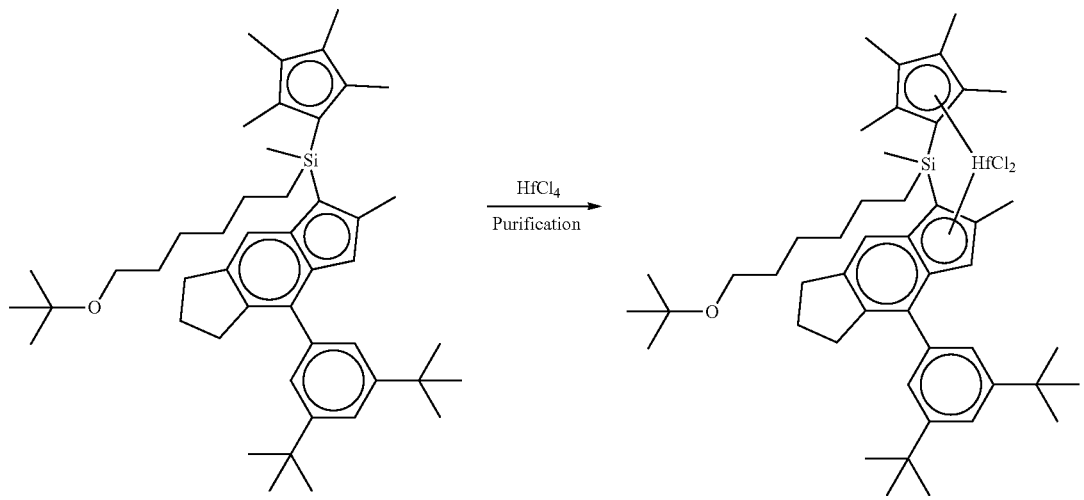

Preparation of Transition Metal Compound 6-(tert-butoxy)-hexylmethyl-silanediyl(2-methyl-4-(3',5'-ditertbutylphenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.76 (s, 2H), 7.59 (s, 1H), 7.48 (s, 1H), 6.4 (s, 1H), 3.28 (t, 2H), 2.9-2.83 (m, 4H), 2.15 (s, 6H), 1.96 (m, 2H), 1.82-1.52 (m, 13H), 1.38-1.23 (m, 22H), 1.28 (s, 9H), 0.96-0.86 (m, 5H) ppm.

Comparative Synthesis Example 1

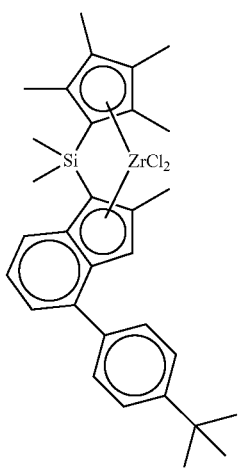

Preparation of Ligand Compound (2-methyl-4-(4'-(tert-butyl)-phenyl) inden-1-yl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

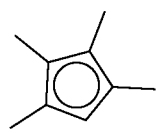

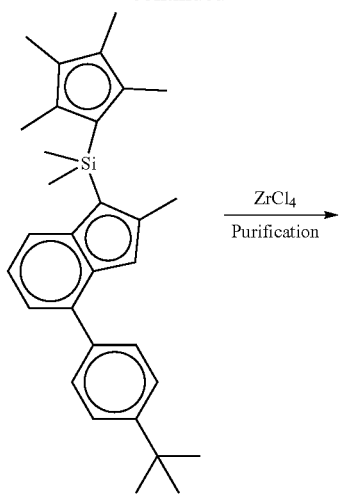

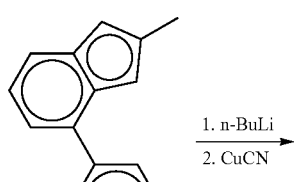

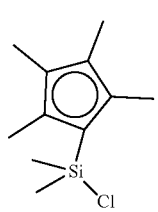

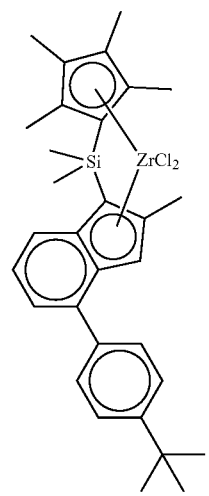

Preparation of Transition Metal Compound dimethylsilanediyl(2-methyl-4-(4'-(tert-butyl)-phenyl) inden-1-yl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl$_4$ (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Synthesis Example 2

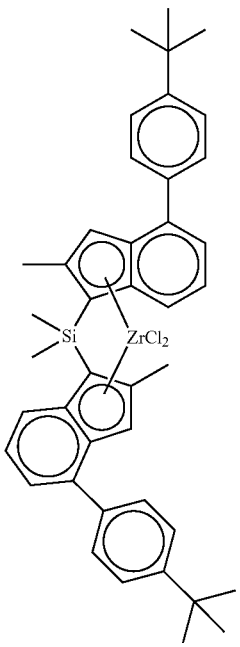

Preparation of Ligand Compound bis(2-methyl-4-(4'-(tert-butyl)-phenyl) inden-1-yl) silane 2-methyl-4-(4'-(tert-butyl)-phenyl) Indene (1 equiv) was dissolved in a mixed solution of toluene/THF (10/1 by volume, 0.3 M), and n-butyllithium (n-BuLi, 2.1 eq) was slowly added dropwise thereto at −25° C., followed by stirring at room temperature for 3 hours. Thereafter, CuCN (2 mol %) was added and stirred for 30 minutes, and then dichloro dimethyl silane (0.53 eq) was added thereto at −10° C., and stirred overnight at room temperature. Thereafter, it was stirred overnight at room temperature, worked up with water and dried to obtain a ligand.

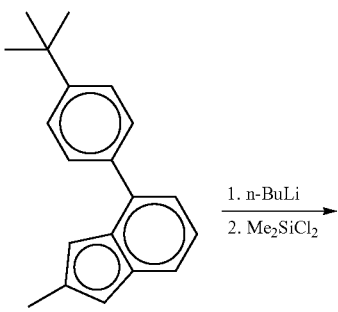

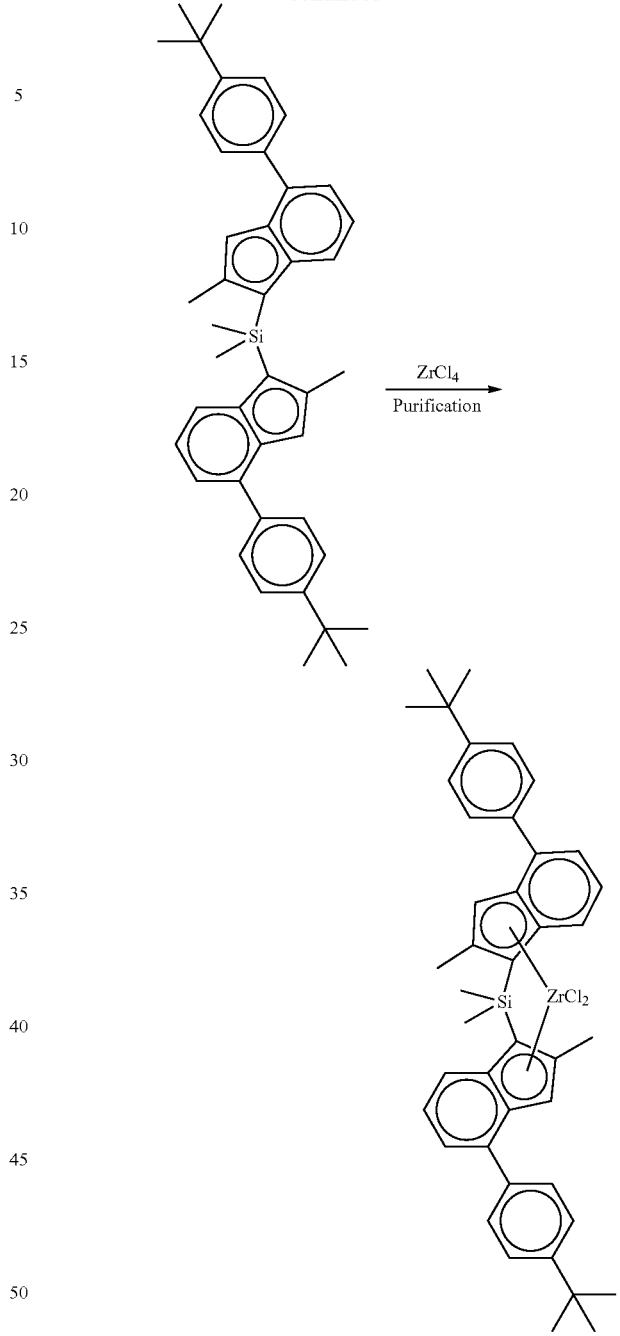

Preparation of Transition Metal Compound dimethylsilanediylbis(2-methyl-4-(4'-(tert-butyl)-phenyl) inden-1-yl) zirconium dichloride The ligand prepared above was dissolved in a mixed solution of toluene/Ether (10/1 by volume, 0.1 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Synthesis Example 3

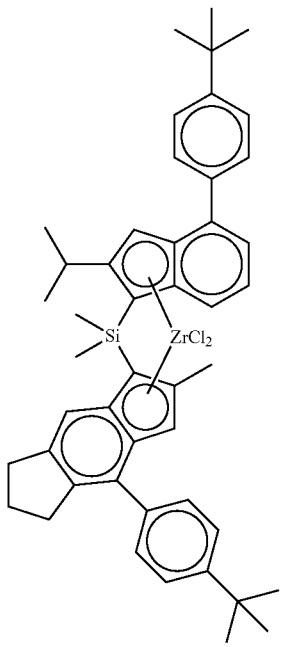

Preparation of Ligand Compound (4-(4'-tert-butylphenyl)-6-methyl-1,2,3,5-tetrahydro-s-indacen-7-yl)dimethyl(2-isopropyl-4-(4'-tertbutylphenyl)-inden-1-yl) silane 2-isopropyl-4-(4'-tertbutylphenyl)-1-indene (1 equiv) was dissolved in Tetrahydrofuran/Hexane (THF/Hexane, 1/10 by volume, 0.3 M), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 4-(4'-tert-butylphenyl)-6-methyl-1,2,3,5-tetrahydro-s-7-indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

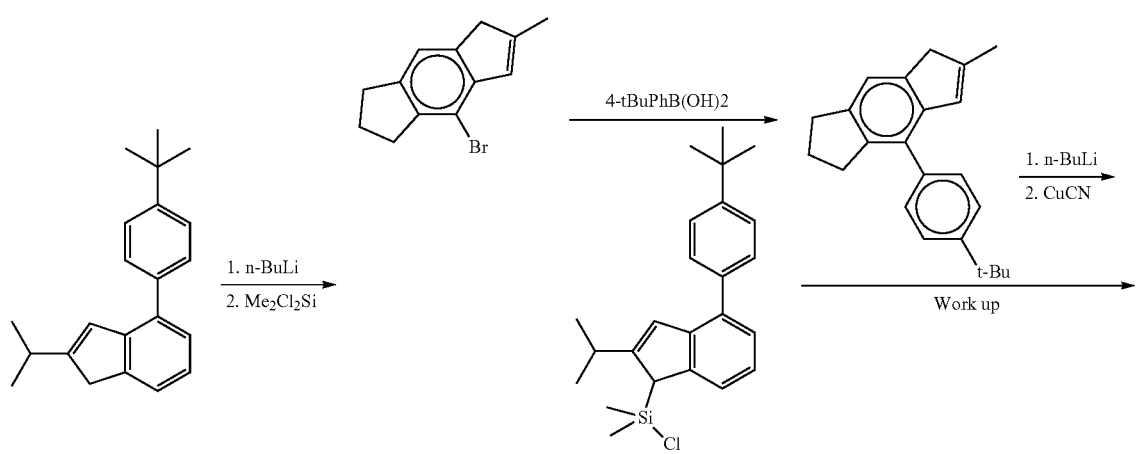

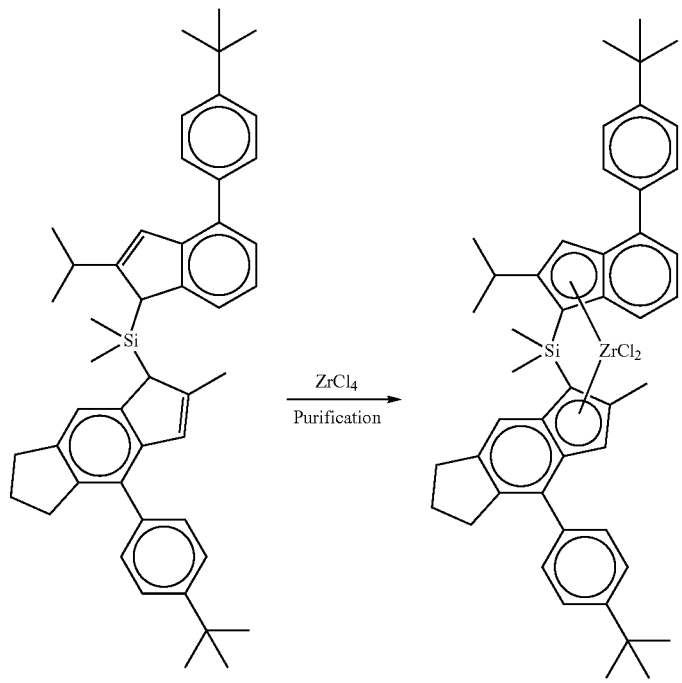

Preparation of Transition Metal Compound dimethylsilanediyl(4-(4'-tert-butylphenyl)-6-methyl-1,2,3,5-tetrahydro-s-indacen-7-yl)(2-isopropyl-4-(4'-tert-butylphenyl)-inden-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing $ZrCl_4$ (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Synthesis Example 4

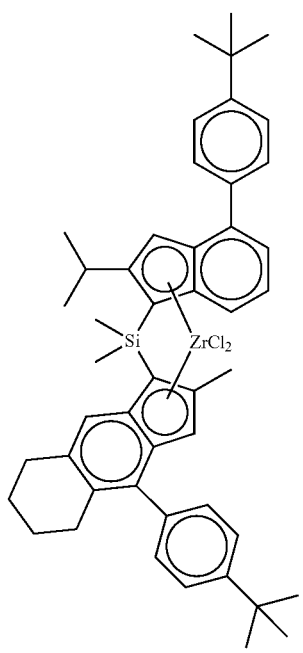

Preparation of Ligand Compound (2-methyl-4-(4'-t-butylphenyl)-tetrahydrocyclopenta[b]naphthalene) dimethyl(2-isopropyl-4-(4'-tert-butylphenyl)indenyl) silane Methacrylic chloride (37.5 mL, 375 mmol) was added to well stirred AlCl3 (100 g, 750 mmol) in $CH_2Cl_2$ (600 mL) at −70° C. After stirring for 20 min, tetrahydronaphthalene (49.5 g, 375 mmol) was added. The temperature of the reaction mixture was raised to room temperature and further stirred for 16 hours. Thereafter, the reaction mixture was poured into ice water-HCl (1 L/150 mL). Then, the organic layer was separated and the aqueous layer was extracted with $CH_2Cl_2$ (2100 mL). The combined organic phases were washed with water, aqueous $NaHCO_3$, dried over $MgSO_4$, and evaporated, sequentially. After vacuum distillation (130-140° C./0.5 Torr), ketone mixture was obtained. Then, after storage for 5 days, the desired isomer remains liquid and can be separated by decantation. Yield: 30 g (40%).

2-Methyl-2,3,5,6,7,8-hexahydro-1H-cyclopenta[b]naphthalen-1-one (30 g, 150 mmol) in $CH_2Cl_2$ (50 mL) prepared above was mixed with a suspension of $AlCl_3$ (40 g, 300 mmol) in $CH_2Cl_2$ (250 mL) at −20° C. After stirring for 20 min, $Br_2$ (7.7 ml, 150 mmol) was added to the reactants. The temperature of the reaction mixture was raised to room temperature and further stirred for 16 hours. Thereafter, the reaction mixture was poured into ice water-HCl (500 mL/70 mL). Then, the organic layer was separated and the aqueous layer was extracted with $CH_2Cl_2$ (twice 50 mL). The combined organic phases were washed with water, aqueous $KHCO_3$, dried over $MgSO_4$, and evaporated, sequentially. The residue was distilled in vacuo (175-180° C./0.5 Torr) to give 31 g (74%) of the reaction product, namely, 2-methyl-2,3,5,6,7,8-hexahydro-1H.-Cyclopenta[b]naphthalen-1-one was obtained.

$Pd(OAc)_2$ (0.74 g, 3 mol %) and $PPh_3$ (1.73 g, 6 mol %) were combined with the above 2-methyl-2,3,5,6,7,8-hexahydro-1H-cyclopenta[b]naphthalen-1-one (31 g, 110 mmol), tert-butylphenylboronic acid (26.7 g, 150 mmol), and $Na_2CO_3$ (31.8 g, 300 mmol) in dimethoxyethane (380 mL)/$H_2O$ (130 mL) stirred well. The resulting mixture was refluxed with stirring for 6 h, cooled, poured into water (700 mL), and extracted with benzene (4 times, each of 100 mL). The resulting solution was filtered and evaporated. The reaction product, 4-(4-t-butylphenyl)-2-methyl-2,3,5,6,7,8-hexahydro-1H-cyclopenta[b]naphthalen-1-one, was subjected to column chromatography (silicagel 60, hexane/$CH_2Cl_2$=1:1). The yield was 18.3 g (50%).

$LiAlH_4$ (0.95 g, 25 mmol) was added to the solution of the above product, 4-(4-tert-butylphenyl)-2-methyl2,3,5,6,7,8-hexahydro-1H-cyclopenta[b] naphthalen-1-one (16.6 g, 50 mmol) dissolved in diethyl ether ($Et_2O$, 150 mL) at −20° C. The temperature of the reaction mixture was raised to room temperature and further stirred for 1 hour. Thereafter, 5% HCl (100 mL) was added to the reactants, and the resulting mixture was extracted with $Et_2O$ (3 times, each of 50 mL). The combined organic phases were washed with water, dried over $MgSO_4$, and evaporated, sequentially. Benzene (300 mL) and p-TSA (0.5 g) were added and the resulting solution was refluxed within 4 h with a Dean Stark head (controlled by TLC, benzene/EtOAc 4:1). Then, the resulting solution was washed with water, aqueous $KHCO_3$, and dried over $MgSO_4$. Thereafter, the residue was passed through silica gel and evaporated to give 12.8 g (81%) of the reaction product, 9-(4-tert-butylphenyl)-2-methyl-5,6,7,8-tetrahydro-1H-cyclopenta[b]naphthalene.

A solution of the above 9-(4-tert-butylphenyl)-2-methyl-5,6,7,8-tetrahydro-1H-cyclopenta[b]naphthalene (2.97 g, 9.38 mmol) in $Et_2O$ (50 mL) was cooed to −60° C. and add n-BuLi (1.6 M in hexanes, 6.04 mL, 9.67 mmol). The resulting mixture was warmed to room temperature, stirred for 3 h, and cooled to −60° C. Then, CuCN (50 mg, 0.55 mmol) was added. After stirring for 15 min, a solution of chloro-(4-(4-tert-butylphenyl)-2-isopropyl-1H-inden-1-yl)-dimethylsilane (9.67 mmol) in $Et_2O$ (24 mL) was added. The resulting mixture was warmed to room temperature and stirred for 16 h. Then, water (5 mL) and hexanes (200 mL) were added. Thereafter, the organic phase was separated, dried over $MgSO_4$, passed through silicagel and evaporated. The reaction product, [4-(4-t-butylphenyl)-2-isopropyl-1H-inden-1-yl][4-(4-tert-butylphenyl)-2-methyl-5,6,7,8-tetrahydro-1H-cyclopenta[b]naphthalen-1-yl]dimethylsilane was dried in vacuo and used without purification.

Preparation of Transition Metal Compound dimethylsilanediyl(2-Methyl-4-(4'-t-butylphenyl)-tetrahydrocyclopenta[b]naphthalene)(2-isopropyl-4-(4'-tert-butylphenyl)indenyl) zirconium dichloride The ligand compound prepared above, [4-(4-tert-butylphenyl)-2-isopropyl-1H-inden-1-yl][4-(4-tert-butylphenyl)-2-methyl-5, 6,7,8-tetrahydro-1H-cyclopenta[b]naphthalen-1-yl]dimethylsilane (5.82 g, 8.78 mmol) was dissolved in $Et_2O$ (60 mL), cooled to −40° C., n-BuLi (1.6 M in hexanes, 11.52 mL, 18.44 mmol) was added. The reaction mixture was warmed to room temperature, stirred for 3 h, and evaporated. The residue was suspended in pentane (100 mL), cooled to −60° C. and $ZrCl_4$ (2.15 g, 9.22 mmol) was added. After 5 min, $Et_2O$ (1 mL) was added. The resulting mixture was warmed to room temperature, stirred for an additional 16 h, and filtered. The resulting yellow-orange powder was dried, dimethoxyethane (100 mL) and LiCl (0.3 g) were added, and the mixture was refluxed with stirring for 6 hours. Subsequent recrystallization from dimethoxyethane and $CH_2Cl_2/Et_2O$ gave the product. The yield of the rock-form of the obtained product was 0.88 g (24.4%).

Comparative Synthesis Example 5

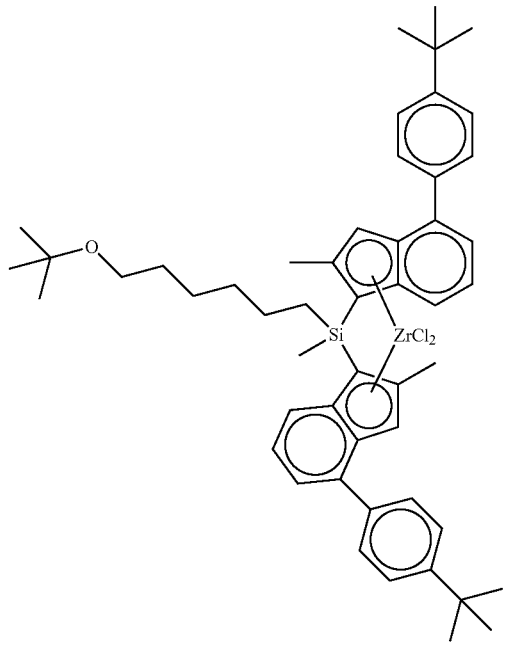

Preparation of Ligand Compound [(6-tertbutoxy-hexyl)(methyl)-bis[2-methyl-4-phenyl)-inden-1-yl] silane First, 100 mL of t-butoxyhexyl magnesium chloride solution (about 0.14 mol, ether) was slowly added dropwise to 100 mL of trichloromethylsilane solution (about 0.21 mol, hexane) over 3 hours at −100° C. The mixture was stirred at room temperature for 3 hours. After separating the transparent organic layer from the mixed solution, the separated transparent organic layer was vacuum-dried to remove excess trichloromethylsilane to obtain (6-t-butoxyhexyl)dichloromethylsilane as a transparent liquid.

To 77 mL of 2-methyl-4-phenylindene toluene/THF=10/1 solution (34.9 mmol), 15.4 mL of n-butyllithium solution (2.5 M, hexane solvent) was slowly added dropwise at 0° C., and stirred at 80° C. for for 1 hour. Thereafter, the reaction mixture was stirred at room temperature for one day. Then, 5 g of (6-tert-butoxyhexyl)dichloromethylsilane prepared above was slowly added dropwise to the reaction mixture at −78° C., stirred for about 10 minutes, and then stirred at 80° C. for 1 hour. Then, water was added to separate the organic layer, purified by silica column, and dried under vacuum to obtain a sticky yellow oil in a yield of 78% (racemic: meso=1:1).

$^1$H NMR (500 MHz, CDCl$_3$): 0.10 (s, 3H), 0.98 (t, 2H), 1.25 (s, 9H), 1.36~1.50 (m, 8H), 1.62 (m, 8H), 2.26 (s, 6H), 3.34 (t, 2H), 3.81 (s, 2H), 6.87 (s, 2H), 7.25 (t, 2H), 7.35 (t, 2H), 7.45 (d, 4H), 7.53 (t, 4H), 7.61 (d, 4H).

Preparation of Transition Metal Compound [(6-tertbutoxyhexylmethylsilanediyl)-bis[2-methyl-4-(4'-tertbutylphenyl)]zirconium dichloride Ligand compound prepared above, (6-tert-butoxyhexyl) (methyl) bis (2-methyl-4-phenyl) indenylsilane ether/hexane=1/1 solution (3.37 mmol) in 50 mL of n-butyl 3.0 mL of lithium solution (2.5 M in hexane) was slowly added dropwise at −78° C., stirred at room temperature for about 2 hours, and then vacuum dried. The salt was washed with hexane, filtered and dried under vacuum to obtain a yellow solid. Ligand salt synthesized in a glove box and bis(N,N'-diphenyl-1,3-propanediamido)dichlorozirconium bis(tetrahydrofuran) [Zr(C$_5$H$_6$NCH$_2$CH$_2$NC$_5$H$_6$)Cl$_2$(C$_4$H$_8$O)$_2$] was weighed into a shrink flask, and ether was slowly added dropwise at −78° C., followed by stirring at room temperature for one day. Thereafter, the red reaction solution was separated by filtration, and 4 equivalents of an HCl ether solution (1 M) was slowly added dropwise at −78° C., followed by stirring at room temperature for 3 hours. After filtration and vacuum drying, ansa-metallocene compound as an orange solid component was obtained in a yield of 85% (racemic:meso=10:1).

$^1$H NMR (500 MHz, C$_6$D$_6$, 7.24 ppm): 1.19 (9H, s), 1.32 (3H, s), 1.48~1.86 (10H, m), 2.25 (6H, s), 3.37 (2H, t), 6.95 (2H, s), 7.13 (2H, t), 7.36 (2H, d), 7.43 (6H, t), 7.62 (4H, d), 7.67 (2H, d).

Comparative Synthesis Example 6

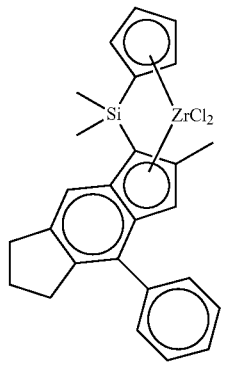

Preparation of Ligand Compound (2-methyl-4-phenyl)Indacen-1-yl)dimethyl(cyclopentadienyl) silane Dicyclopentadiene was condensed through cracking at 150° C. to extract cyclopentadiene, and cyclopentadiene (1 equiv) was dissolved in THF (0.3 M). Then, n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-phenyl indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

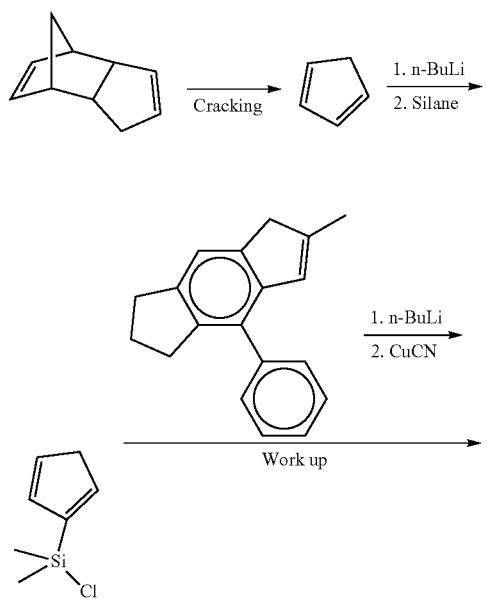

-continued

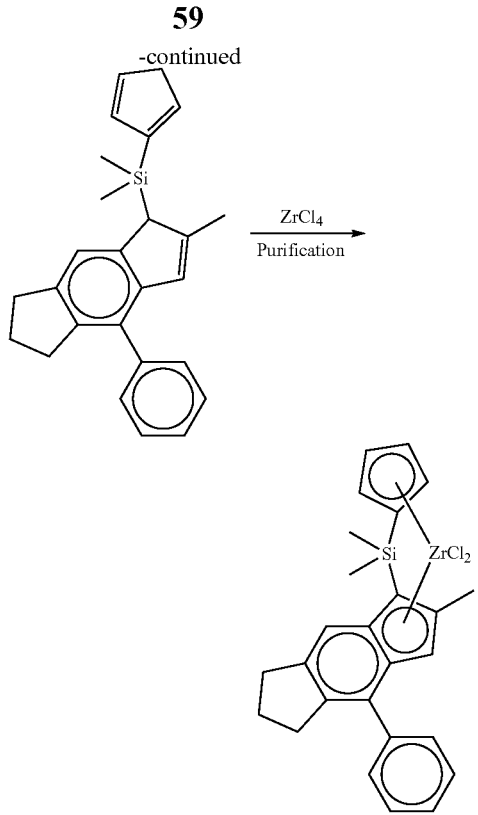

Preparation of Transition Metal Compound dimethyl-silanediyl(cyclopentadienyl)(2-methyl-4-phenyl)Indacenyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, $CDCl_3$): 7.54-7.38 (m, 6H), 6.54-6.52 (m, 4H), 6.37 (s, 1H), 2.85-2.80 (m, 4H), 1.95 (m, 2H), 1.77 (s, 3H), 0.98 (s, 6H) ppm.

Preparation of Supported Catalyst

Preparation Example 1

100 g of a silica carrier (Silica gel, SYLOPOL 952X, calcinated under 250° C.) was placed in a 2 L reactor under an argon (Ar) atmosphere, and 766 mL of methylaluminoxane (MAO) was slowly added at room temperature, followed by stirring at 90° C. for 15 hours. After completion of the reaction, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula.

700 μmol of the metallocene compound prepared in Synthesis Example 1 was dissolved in 400 mL of toluene, and transferred to the reactor using a cannula. After stirring at 50° C. for 5 hours, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula. This process was repeated twice. In the same manner, 400 mL of hexane was added thereto, stirred for 1 minute, and then allowed to stand for 15 minutes to decant the solvent using a cannula. Thereafter, an antistatic agent (Atmer 163, 3 g) was dissolved in 400 mL of hexane and then transferred to the reactor using a cannula. Thereafter, the solvent was removed by stirring at room temperature for 20 minutes and transferring it through a glass filter.

It was dried at room temperature under vacuum for 5 hours, and then dried at 45° C. under vacuum for 4 hours to obtain a supported catalyst.

Preparation Examples 2 to 12

A silica-supported metallocene catalyst was prepared in the same manner as in Preparation Example 1, except that each of the metallocene compounds of Synthesis Examples 2 to 12 was used instead of the metallocene compound of Synthesis Example 1, respectively.

Comparative Preparation Examples 1 to 6

A silica-supported metallocene catalyst was prepared in the same manner as in Preparation Example 1, except that each of the metallocene compounds of Comparative Synthesis Examples 1 to 6 was used instead of the metallocene compound of Synthesis Example 1, respectively.

Propylene-Ethylene Random Copolymerization

Example 1

In the presence of the silica-supported metallocene catalyst prepared in Preparation Example 1, bulk-slurry polymerization of propylene and ethylene was performed using two continuous loop reactors.

At this time, for bulk-slurry polymerization, the supported catalyst prepared according to Preparation Example 1 was used in the form of a mud catalyst mixed with oil and grease at 16 wt %. The catalyst mixture prepare above was introduced into a pre-polymerization reactor together with about 20 kg/hr of propylene, and after a residence time of 8 minutes or more had elapsed, it was continuously introduced into a loop reactor. At this time, hydrogen was introduced together with propylene flowing into the loop reactor, the reactor temperature was maintained at about 70° C. and the reactor pressure was maintained at a pressure of about 35 kg/cm$^2$. At this time, the input of hydrogen was carried out in the amount of about 150 ppm based on the amount of propylene (C3) continuously input. In addition, ethylene (C2) was directly introduced into the loop reactor so as to be 3.5 wt % based on the amount of propylene (C3) continuously input, and a bulk-slurry polymerization process was performed.

Examples 2 to 12

Bulk-slurry polymerization of propylene and ethylene was performed in the same manner as in Example 1, except that each of the silica-supported metallocene catalysts of Preparation Examples 2 to 12 was used instead of the silica-supported metallocene catalyst of Preparation Example 1, respectively.

Comparative Example 1

Bulk-slurry polymerization of propylene and ethylene was performed in the same manner as in Example 1, except that the input amount of ethylene (C2) was changed to be 2.0 wt % based on the input amount of the propylene (C3).

Comparative Example 2

Bulk-slurry polymerization of propylene and ethylene was performed in the same manner as in Example 1, except that the input amount of ethylene (C2) was changed to be 2.6 wt % based on the input amount of the propylene (C3).

Comparative Example 3

Bulk-slurry polymerization of propylene and ethylene was performed in the same manner as in Example 1, except that a Ziegler-Natta (Z/N) catalyst (manufacturer: Lyondellbasell, product name: ZN127VS) was used instead of the metallocene catalyst, and the input amount of ethylene (C2) was changed to be 3.0 wt % based on the input amount of the propylene (C3).

Comparative Example 4

Bulk-slurry polymerization of propylene and ethylene was performed in the same manner as in Example 1, except that the silica-supported metallocene catalyst prepared in Comparative Preparation Example 1 was used as the metallocene catalyst, and the input amount of ethylene (C2) was changed to be 2.0 wt % based on the input amount of the propylene (C3).

Comparative Example 5

Bulk-slurry polymerization of propylene and ethylene was performed in the same manner as in Comparative Example 4, except that the input amount of ethylene (C2) was changed to be 2.5 wt % based on the input amount of the propylene (C3).

Comparative Example 6

Bulk-slurry polymerization of propylene and ethylene was performed in the same manner as in Comparative Example 4, except that the input amount of ethylene (C2) was changed to be 3.5 wt % based on the input amount of the propylene (C3), but fouling in the polymerization process (Fouling) occurred.

Comparative Example 7

Bulk-slurry polymerization of propylene and ethylene was performed in the same manner as in Example 1, except that the silica-supported metallocene catalyst prepared in Comparative Preparation Example 2 was used as the metallocene catalyst, and the input amount of ethylene (C2) was changed to be 3.0 wt % based on the input amount of the propylene (C3).

Comparative Example 8

Bulk-slurry polymerization of propylene and ethylene was performed in the same manner as in Comparative Example 7, except that the input amount of ethylene (C2) was changed to be 4.5 wt % based on the input amount of the propylene (C3).

Comparative Example 9

Bulk-slurry polymerization of propylene and ethylene was performed in the same manner as in Comparative Example 7, except that the input amount of ethylene (C2) was changed to be 6.0 wt % based on the input amount of the propylene (C3), but fouling in the polymerization process (Fouling) occurred.

Comparative Example 10

Bulk-slurry polymerization of propylene and ethylene was performed in the same manner as in Example 1, except that the silica-supported metallocene catalyst prepared in Comparative Preparation Example 3 was used as the metallocene catalyst, and the input amount of ethylene (C2) was changed to be 6.0 wt % based on the input amount of the propylene (C3).

Comparative Example 11

Bulk-slurry polymerization of propylene and ethylene was performed in the same manner as in Example 1, except that the silica-supported metallocene catalyst prepared in Comparative Preparation Example 4 was used as the metallocene catalyst, and the input amount of ethylene (C2) was changed to be 5.5 wt % based on the input amount of the propylene (C3).

Comparative Example 12

Bulk-slurry polymerization of propylene and ethylene was performed in the same manner as in Example 1, except that the silica-supported metallocene catalyst prepared in Comparative Preparation Example 5 was used as the metallocene catalyst, and the input amount of ethylene (C2) was changed to be 4.5 wt % based on the input amount of the propylene (C3).

Comparative Example 13

Bulk-slurry polymerization of propylene and ethylene was performed in the same manner as in Example 1, except that the silica-supported metallocene catalyst prepared in Comparative Preparation Example 6 was used as the metallocene catalyst, and the input amount of ethylene (C2) was changed to be 2.0 wt % based on the input amount of the propylene (C3).

Experimental Example

Evaluation of Physical Properties of Propylene-Ethylene Random Copolymer

The physical properties of the propylene-ethylene random copolymer prepared in Examples and Comparative Example were evaluated in the following manner.

(1) Comonomer Content (C2, wt %)

The comonomer content was determined according to American Society for Testing and Materials, ASTM D 5576 by fixing a film or a film-shaped specimen of the propylene random copolymer to a magnetic holder of FT-IR instrument, measuring the height of a peak in 4800 cm$^{-1}$ to 3500 cm$^{-1}$ reflecting a thickness of the specimen and the area of a peak in 710 cm$^{-1}$ to 760 cm$^{-1}$ indicating the ethylene component from IR absorption spectrum, and then substituting the measured values into Calibration Equation obtained by plotting a value obtained by dividing the area of a peak in 710 cm$^{-1}$ to 760 cm$^{-1}$ by the height of a peak in 4800 cm$^{-1}$ to 3500 cm$^{-1}$ of a standard sample.

(2) Melting Point (Tm) and Crystallization Temperature (Tc)

The melting point (Tm) and crystallization temperature (Tc) of the propylene random copolymer to be measured using a differential scanning calorimeter (DSC, device name: DSC 2920, manufacturer: TA instrument).

In detail, the polypropylene polymer was heated to 200° C. by increasing the temperature, and then maintained at the same temperature for 5 minutes, followed by lowering the temperature to 30° C. Then, the temperature was increased again, and the temperature corresponding to a peak in the DSC (Differential Scanning calorimeter, manufactured by TA) curve was determined as the melting point (Tm). Thereafter, when the temperature was lowered to 30° C. again, the top of the curve was taken as the crystallization temperature (Tc). In this regard, the temperature was increased and decreased at a rate of 10° C./min, respectively, and the melting point (Tm) the crystallization temperature (Tc) are a result measured at a second temperature increase and decrease section.

(3) Melt Index (Melt Index, MI)

The melt index was measured with a load of 2.16 kg at 230° C. according to ASTM D 1238 method of the American Society for Testing and Materials, and expressed as the weight (g) of the polymer melted for 10 minutes.

(4) Haze (%)

According to American Society for Testing and Materials, ASTM D 1003 of the American Society for Testing and Materials, the degree of refraction of light (%) was measured when 1 T (1 mm) of a propylene-ethylene random copolymer specimen was irradiated with light. Haze measured the transparency of the specimen as Td (refracted light)/Tt (passed light)×100(%)

(5) Xylene Solubles (X·S, wt %)

Each sample of the propylene-ethylene random copolymer was mixed with xylene and dissolved at 135° C. for 1 hour, and cooled for 30 minutes to perform pre-treatment. Xylene was flowed for 4 hours at a flow rate of 1 mL/min in OminiSec (Viscotek's FIPA) equipment, and RI (Refractive Index), DP (Pressure across middle of bridge), IP (Inlet pressure through bridge top to bottom) was stabilized. Thereafter, the concentration of the pre-treated sample and the amount of injection were written and measured, and then the peak area was calculated.

(6) Total Volatile Organic Compound Emission (TVOC, ppm)

According to the VDA 277 method, the total volatile organic compound emission (TVOC, ppm) contained in the propylene-ethylene random copolymer was measured using a headspace-GC (gas chromatography) apparatus.

Table 1 shows the evaluation results of the physical properties of the propylene-ethylene random copolymer measured by the method as described above.

TABLE 1

| | Polymerization process | | Properties of copolymer | | | | | | |
|---|---|---|---|---|---|---|---|---|---|
| | Catalyst | C2 input (wt %) | C2 content (IR Spectrum, wt %) | Tm (° C.) | Random Tc (° C.) | MI (g/10 min) | Haze (wt %) | X·S (wt %) | TVOC (ppm) |
| Example 1 | Preparation Example 1 | 3.5 | 4.3 | 125.2 | 73.0 | 18.8 | 7.1 | 0.6 | 58 |
| Example 2 | Preparation Example 2 | 3.5 | 4.2 | 126.2 | 73.8 | 19.1 | 7.2 | 0.7 | 55 |
| Example 3 | Preparation Example 3 | 3.5 | 4.3 | 125.4 | 72.5 | 19.1 | 7.1 | 0.8 | 55 |
| Example 4 | Preparation Example 4 | 3.5 | 4.2 | 125.4 | 72.6 | 19.2 | 7.3 | 0.6 | 58 |
| Example 5 | Preparation Example 5 | 3.5 | 4.2 | 125.5 | 72.8 | 19.5 | 7.2 | 0.7 | 55 |
| Example 6 | Preparation Example 6 | 3.5 | 4.2 | 125.3 | 72.8 | 18.5 | 7.2 | 0.8 | 58 |
| Example 7 | Preparation Example 7 | 3.5 | 4.1 | 125.3 | 73.5 | 18.4 | 7.4 | 0.6 | 58 |
| Example 8 | Preparation Example 8 | 3.5 | 4.2 | 125.4 | 73.1 | 18.4 | 7.3 | 0.8 | 57 |
| Example 9 | Preparation Example 9 | 3.5 | 4.2 | 125.2 | 73.2 | 18.6 | 7.3 | 0.7 | 56 |
| Example 10 | Preparation Example 10 | 3.5 | 4.2 | 125.1 | 73.0 | 18.6 | 7.2 | 0.7 | 57 |
| Example 11 | Preparation Example 11 | 3.5 | 4.3 | 125.8 | 72.8 | 18.4 | 7.1 | 0.7 | 55 |
| Example 12 | Preparation Example 12 | 3.5 | 4.2 | 125.6 | 73.8 | 18.5 | 7.2 | 0.8 | 58 |
| Comparative Example 1 | Preparation Example 1 | 2.0 | 2.6 | 134.6 | 85.5 | 18.1 | 8.3 | 0.8 | 54 |
| Comparative Example 2 | Preparation Example 1 | 2.6 | 3.3 | 130.6 | 80.1 | 18.5 | 7.8 | 0.6 | 56 |
| Comparative Example 3 | Z/N | 3.0 | 5.2 | 138.1 | 111 | 18 | 8.3 | 4.5 | 310 |
| Comparative Example 4 | Comparative Preparation Example 1 | 2.0 | 2.3 | 131.1 | 83.1 | 18.4 | 8.5 | 0.6 | 56 |

TABLE 1-continued

| | | Polymerization process | | Properties of copolymer | | | | | | |
|---|---|---|---|---|---|---|---|---|---|---|
| | | | C2 input (wt %) | C2 content (IR Spectrum, wt %) | Tm (° C.) | Random Tc (° C.) | MI (g/10 min) | Haze (wt %) | X · S (wt %) | TVOC (ppm) |
| | Catalyst | | | | | | | | | |
| Comparative Example 5 | Comparative Preparation Example 1 | | 2.5 | 2.8 | 125.8 | 73.5 | 19.3 | 8.1 | 0.6 | 61 |
| Comparative Example 6 | Comparative Preparation Example 1 | | 3.5 | not measurable | not measurable | not measurable | not measurable | not measurable | not measurable | not measurable |
| Comparative Example 7 | Comparative Preparation Example 2 | | 3.0 | 2 | 132.1 | 83.8 | 19.1 | 8.8 | 0.8 | 58 |
| Comparative Example 8 | Comparative Preparation Example 2 | | 4.5 | 2.8 | 126.1 | 74.5 | 20 | 8.2 | 0.6 | 56 |
| Comparative Example 9 | Comparative Preparation Example 2 | | 6.0 | not measurable | not measurable | not measurable | not measurable | not measurable | not measurable | not measurable |
| Comparative Example 10 | Comparative Preparation Example 3 | | 6.0 | 3.5 | 126.1 | 78.1 | 18.2 | 7.8 | 0.6 | 56 |
| Comparative Example 11 | Comparative Preparation Example 4 | | 5.5 | 3.3 | 125.8 | 77.1 | 19.6 | 7.7 | 0.7 | 50 |
| Comparative Example 12 | Comparative Preparation Example 5 | | 4.5 | 2.6 | 125.7 | 76.8 | 20.1 | 8.3 | 1.1 | 54 |
| Comparative Example 13 | Comparative Preparation Example 6 | | 2.0 | not measurable | not measurable | not measurable | not measurable | not measurable | not measurable | not measurable |

As shown in Table 1 above, the propylene-ethylene random copolymers of Examples 1 to 12 according to an embodiment of the present disclosure secure a high melting point (Tm) of 125.2° C. to 126.2° C. to increase ethylene (C2) contents in the copolymers while maintaining improved process stability and other injection properties. Also, it was confirmed that the increased ethylene (C2) content exhibited a characteristic of lowering the crystallinity, thereby improving the transparency. In addition, in the case of Examples 1 to 12, it can be seen that the TVOC is remarkably low, so that eco-friendliness can be secured with a highly transparent propylene-ethylene random copolymer used for food containers and the like.

In contrast, even in Comparative Examples 1 and 2 using the same catalyst precursor of Preparation Example 1 as in Example 1, as the input amount of ethylene (C2) decreased in the polymerization process, the ethylene (C2) content of the copolymer decreased, resulting in haze of 8.3% and 7.8%, and it can be seen that the transparency is lowered.

In addition, Comparative Example 3 using a Ziegler-Natta (Z/N) catalyst showed a blocky non-uniform copolymerization of ethylene (C2) in the polymer structure of ethylene (C2) despite a high ethylene (C2) content, resulting in a crystallization temperature (Tc) was very high at 111° C., TVOC was extremely high at 310 ppm, and the atactic xylene soluble content (XS) was also very high at 4.5 wt %.

On the other hand, in Comparative Examples 4 to 6 using a catalyst composition containing no indacene ligand but containing a commonly known metallocene compound of a ligand containing cyclopentadienyl, if the Tm range in which fouling does not occur is maintained. There was a limit to increasing the ethylene (C2) content, so it was not possible to reach a certain degree of transparency. In particular, in Comparative Example 6, fouling occurred in the polymerization process, and it was not possible to evaluate the physical properties of the copolymer.

As such, in Comparative Examples 7 to 9, in which the catalyst composition of Comparative Preparation Example 2 including a metallocene compound having an indene ligand bridged instead of a cyclopentadienyl (Cp) ligand bridged with an indacene ligand was used, basically since the Tm itself of homo polypropylene is low, when the ethylene (C2) content is increased, fouling occurs, and it is not possible to maintain a certain level of the ethylene (C2) content. Moreover, the ethylene (C2) reactivity was poor, so the input amount of ethylene (C2) had to be very high in order to secure an equivalent level of ethylene content in the copolymer. In particular, in the case of Comparative Example 9, fouling occurred in the polymerization process, and it was not possible to evaluate the physical properties of the copolymer.

In addition, in Comparative Examples 10 to 12 using a catalyst composition including a metallocene compound having a bis-indenyl (or indacenyl) group, the ethylene conversion rate (C2 conversion) is very low, so the input amount of ethylene (C2) must be high for copolymerization. It was possible to raise the ethylene (C2) content in the body to a certain level or more, and there was also a limit in increasing the ethylene (C2) content, so that a certain degree of transparency could not be reached.

On the other hand, in the case of Comparative Example 13, atactic polypropylene was generated due to a structure that could not have racemo selectivity, which gave the polypropylene directionality, and, therefore, it was not possible to evaluate the physical properties of the copolymer.

The invention claimed is:

1. A propylene-ethylene random copolymer having:
   a melting point (Tm) of 125° C. or higher,
   an ethylene content of 4.0% by weight or more,
   a crystallization temperature (Tc) of 75° C. or lower, and
   a melt index (MI$_{2.16}$, melt index measured at 230° C., 2.16 kg load) of 16 g/10 min to 22 g/10 min.

2. The propylene-ethylene random copolymer of claim 1, wherein the melting point (Tm) is 125° C. to 150° C.

3. The propylene-ethylene random copolymer of claim 1, wherein the ethylene content is 4.0% by weight to 5.5% by weight.

4. The propylene-ethylene random copolymer of claim 1, wherein the crystallization temperature (Tc) is 65° C. to 75° C.

5. The propylene-ethylene random copolymer of claim 1, which has a xylene soluble content (X·S) of 1.0% by weight or less.

6. The propylene-ethylene random copolymer of claim 1, which has a haze measured according to American Society for Testing and Materials, ASTM 1003 method of 7.5% or less.

7. The propylene-ethylene random copolymer of claim 1, which has a total volatile organic compound emission (TVOC) of 70 ppm or less, measured according to the VDA 277 method.

8. The propylene-ethylene random copolymer of claim 1, wherein the propylene-ethylene random copolymer is prepared by copolymerizing propylene monomer and ethylene comonomer in the presence of a catalyst composition including a metallocene compound of the following Chemical Formula 1:

[Chemical Formula 1]

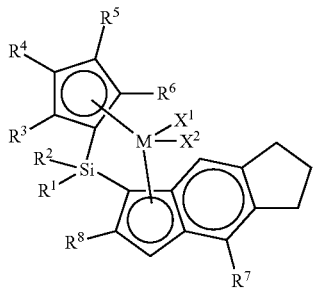

in Chemical Formula 1,
M is a Group 4 transition metal,
X$^1$ and X$^2$ are the same as or different from each other, and are each independently halogen,
R$^1$ and R$^2$ are the same as or different from each other, and are each independently C$_{1-20}$ alkyl, C$_{2-20}$ alkenyl, C$_{2-20}$ alkoxyalkyl, C$_{6-20}$ aryl, C$_{7-40}$ alkylaryl, or C$_{7-40}$ arylalkyl,
R$^3$ to R$^6$ are the same as or different from each other, and are each independently C$_{1-20}$ alkyl,
R$^7$ is substituted or unsubstituted C$_{6-20}$ aryl, and
R$^8$ is C$_{1-20}$ alkyl.

9. The propylene-ethylene random copolymer of claim 8, wherein
the R$^1$ and R$^2$ are each independently C$_{1-8}$ linear or branched alkyl, or C$_{2-12}$ linear or branched alkoxyalkyl,
the R$^3$ to R$^6$ are each independently C$_{1-6}$ linear or branched alkyl,
the M is zirconium or hafnium,
the R$^7$ is phenyl, phenyl substituted with C$_{1-6}$ linear or branched alkyl, naphthyl, or naphthyl substituted with C$_{1-6}$ linear or branched alkyl, and
the R$^8$ is C$_{1-6}$ linear or branched alkyl.

10. The propylene-ethylene random copolymer previously, wherein the metallocene compound is represented by the following Chemical Formula 1-1:

[Chemical Formula 1-1]

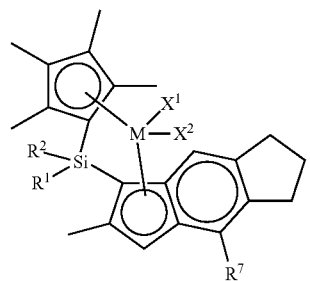

in Chemical Formula 1-1,
M, X$^1$, X$^2$, R$^1$, R$^2$, and R$^7$ are as defined in claim 8.

11. The propylene-ethylene random copolymer of claim 8, wherein the metallocene compound is any one of compounds represented by the following structural formulae:

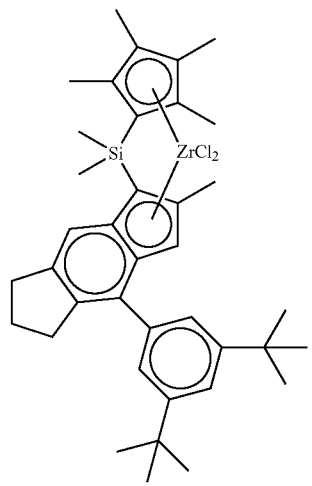

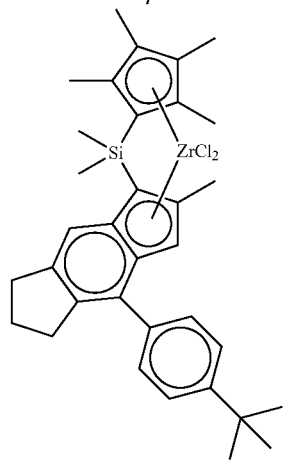 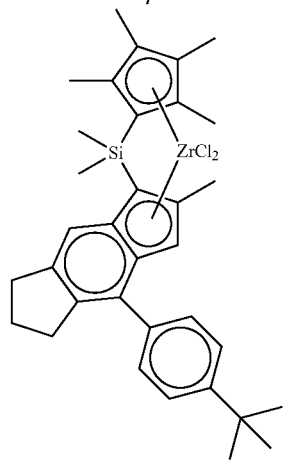

-continued
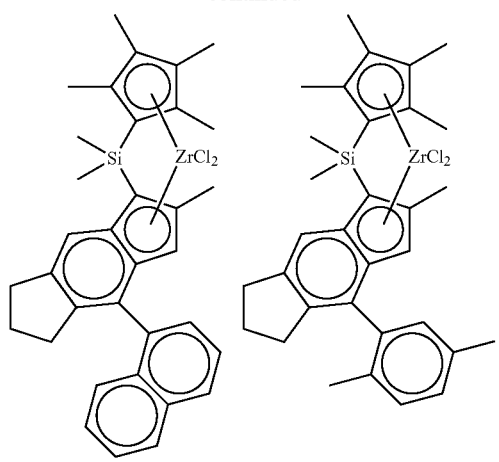
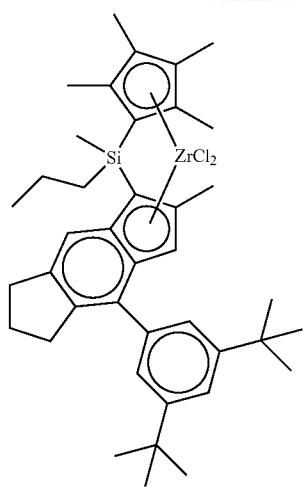
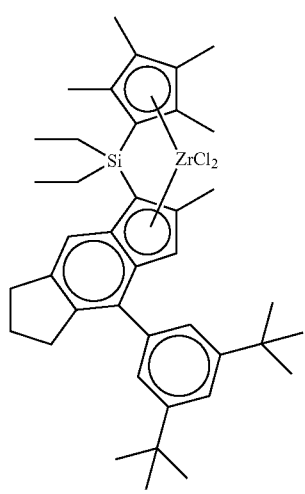
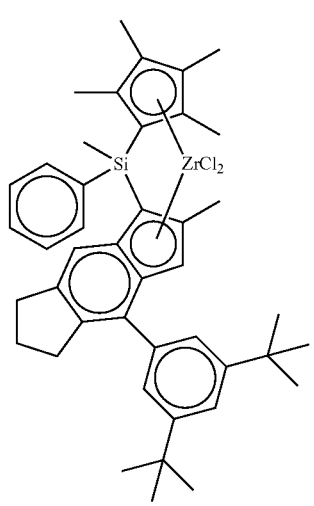
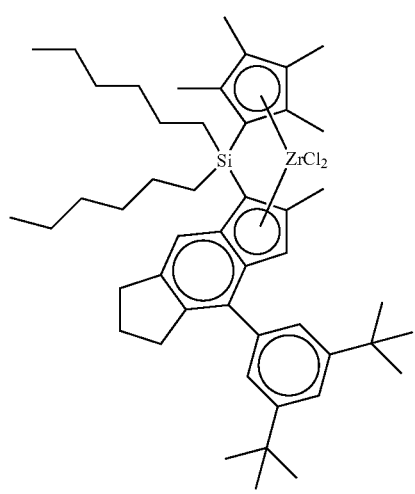
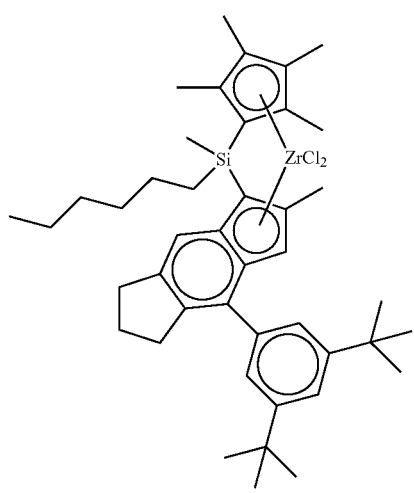

71
-continued
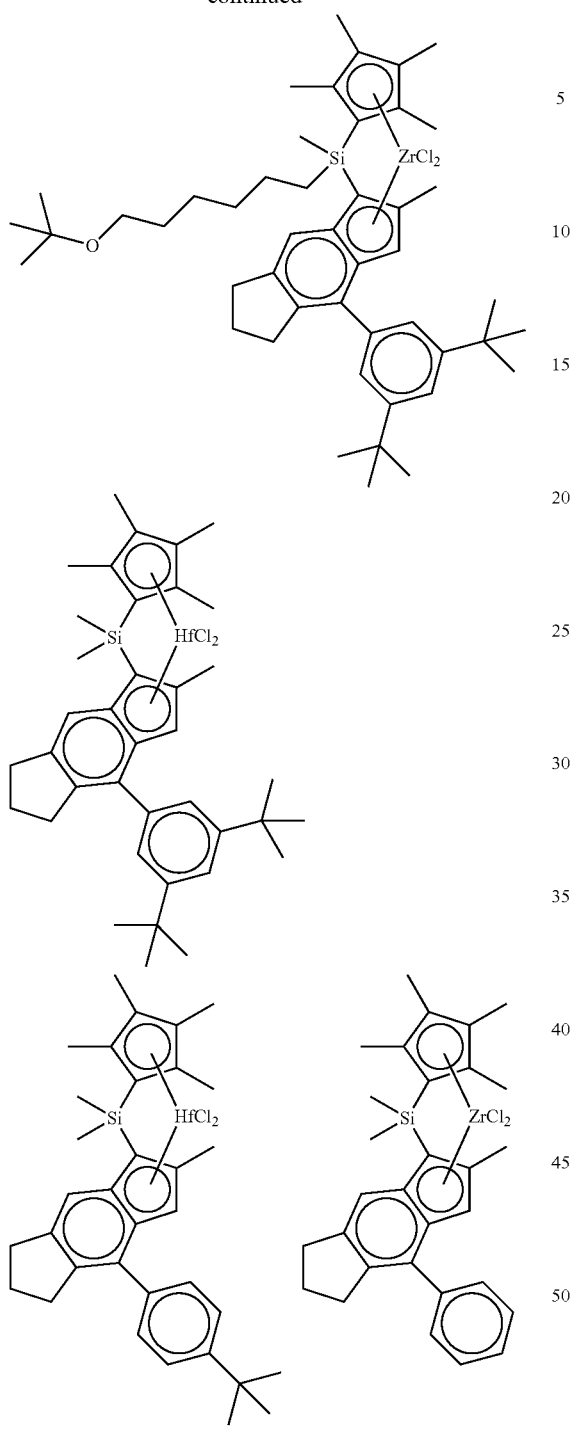
72
-continued
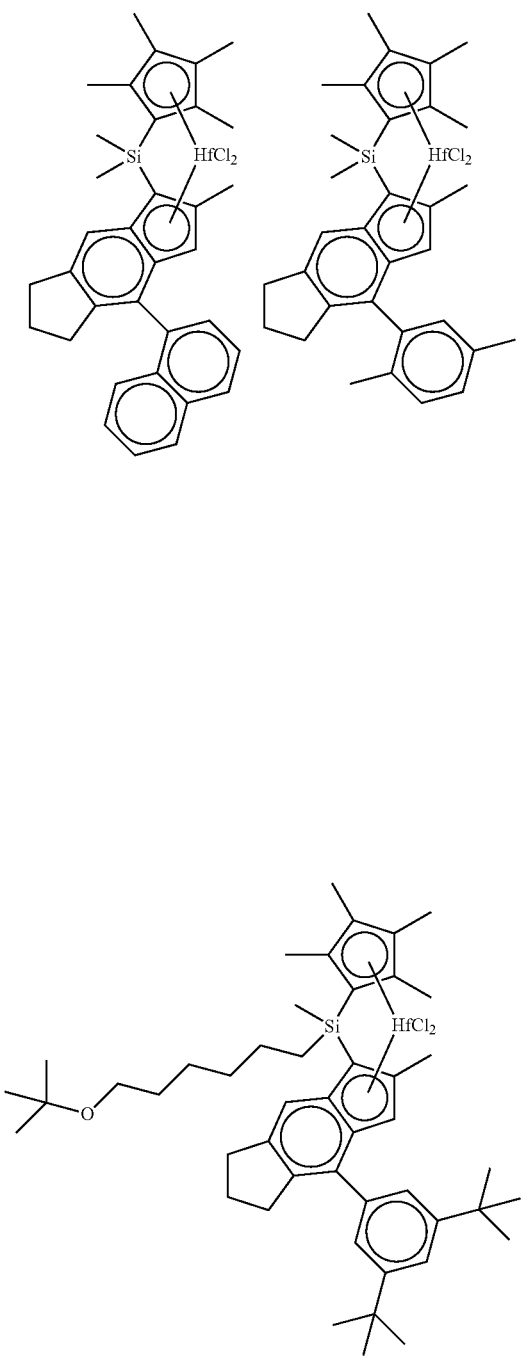
* * * * *